US012630163B2

(12) United States Patent
Hayakawa

(10) Patent No.: US 12,630,163 B2
(45) Date of Patent: May 19, 2026

(54) VEHICLE DRIVING SUPPORT METHOD AND DRIVING SUPPORT DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 33 days.

(21) Appl. No.: 18/881,700

(22) PCT Filed: Jul. 13, 2022

(86) PCT No.: PCT/JP2022/027541
§ 371 (c)(1),
(2) Date: Jan. 6, 2025

(87) PCT Pub. No.: WO2024/013874
PCT Pub. Date: Jan. 18, 2024

(65) Prior Publication Data
US 2026/0001550 A1      Jan. 1, 2026

(51) Int. Cl.
B60W 30/18       (2012.01)
B60W 30/14       (2006.01)
(Continued)

(52) U.S. Cl.
CPC .... B60W 30/18163 (2013.01); B60W 30/143 (2013.01); B60W 50/10 (2013.01);
(Continued)

(58) Field of Classification Search
CPC ......... B60W 30/18163; B60W 30/143; B60W 50/10; B60W 60/001; B60W 60/0053;
(Continued)

(56) References Cited

U.S. PATENT DOCUMENTS

2008/0183342 A1*   7/2008   Kaufmann ........ B60W 60/0061
                                                                                701/1
2018/0154939 A1*   6/2018   Aoki ........................ B60Q 9/00
(Continued)

FOREIGN PATENT DOCUMENTS

JP          2021-119510 A       8/2021

*Primary Examiner* — Thomas E Worden
*Assistant Examiner* — Godfrey Aleksander Maciorowski
(74) *Attorney, Agent, or Firm* — Young Basile Hanlon & MacFarlane, P.C.

(57)       ABSTRACT
A driving assistance method for a vehicle comprises: suspending autonomous lane change control when a driver's steering operation input during execution of the autonomous lane change control satisfies a predetermined suspension condition; executing first autonomous lane change control, which is executed regardless of an indication of the driver's intention, without confirming the indication of the driver's intention; executing second autonomous lane change control, which is executed due to the indication of the driver's intention, when the indication of the driver's intention can be confirmed; and setting the predetermined suspension condition for the first autonomous lane change control to a condition under which the autonomous lane change control is more readily suspended than under the predetermined suspension condition for the second autonomous lane change control.

7 Claims, 8 Drawing Sheets

(51) Int. Cl.
   *B60W 50/10*        (2012.01)
   *B60W 60/00*        (2020.01)
(52) U.S. Cl.
   CPC ...... *B60W 60/001* (2020.02); *B60W 60/0053*
            (2020.02); *B60W 2540/18* (2013.01); *B60W*
                                  *2540/20* (2013.01)
(58) Field of Classification Search
   CPC ......... B60W 2540/18; B60W 2540/20; B60W
                                  50/14; G08G 1/16
   See application file for complete search history.

(56)                 References Cited

U.S. PATENT DOCUMENTS

| | | | |
|---|---|---|---|
| 2019/0071091 A1* | 3/2019 | Zhu ................. | B60W 30/18163 |
| 2019/0143982 A1* | 5/2019 | Hashimoto ........... | B60W 30/12 |
| | | | 701/23 |
| 2020/0307691 A1* | 10/2020 | Kalabic .............. | B62D 15/0255 |
| 2021/0245760 A1 | 8/2021 | Hashimoto et al. | |

* cited by examiner

VEHICLE DRIVING SUPPORT METHOD AND DRIVING SUPPORT DEVICE

TECHNICAL FIELD

The present invention relates to a driving assistance method and a driving assistance device for a vehicle.

BACKGROUND

An automatic driving system is known, which is configured to: when performing lane change control to change lanes from a first lane to a second lane through automatic driving, determine whether or not a stop request operation is performed during a period from the beginning of the lane change control to the end to request that the lane change control be stopped; when the stop request operation is performed, determine whether or not a stop permission condition is established; when the stop permission condition is not established, continue the lane change control; and when the stop permission condition is established, stop the lane change control to make the vehicle travel in the first lane (JP2021-119510A).

SUMMARY

In the above prior art, when the stop request operation is performed, autonomous lane change control is stopped regardless of an indication of the driver's intention. However, in travel scenes in which autonomous lane change control is performed based on the indication of the driver's intention, the driver may perform a steering operation with the intention of advancing or delaying the timing when the vehicle starts to move in the width direction of the road. In this case, the above prior art has a problem in that the autonomous lane change control may be stopped by the steering operation even in a travel scene in which the autonomous lane change control should be continued.

A problem to be solved by the present invention is to provide a driving assistance method and a driving assistance device for a vehicle that are able to appropriately suspend autonomous lane change control depending on the travel scene.

The present invention solves the above problem by setting a predetermined suspension condition for first autonomous lane change control, which is executed regardless of an indication of the driver's intention, to a condition under which the autonomous lane change control is more readily suspended than under the predetermined suspension condition for second autonomous lane change control, which is executed due to the indication of the driver's intention.

According to the present invention, the autonomous lane change control can be appropriately suspended depending on the travel scene.

DETAILED DESCRIPTION

Hereinafter, one or more embodiments of the present invention will be described with reference to the drawings. The following description is made on the assumption that vehicles travel on the left side in a country having a left-side traffic regulation. In countries having right-side traffic regulations, vehicles travel on the right side, so the right and left in the following description are to be read symmetrically.

<Configuration of Driving Assistance System>

Figure 1:
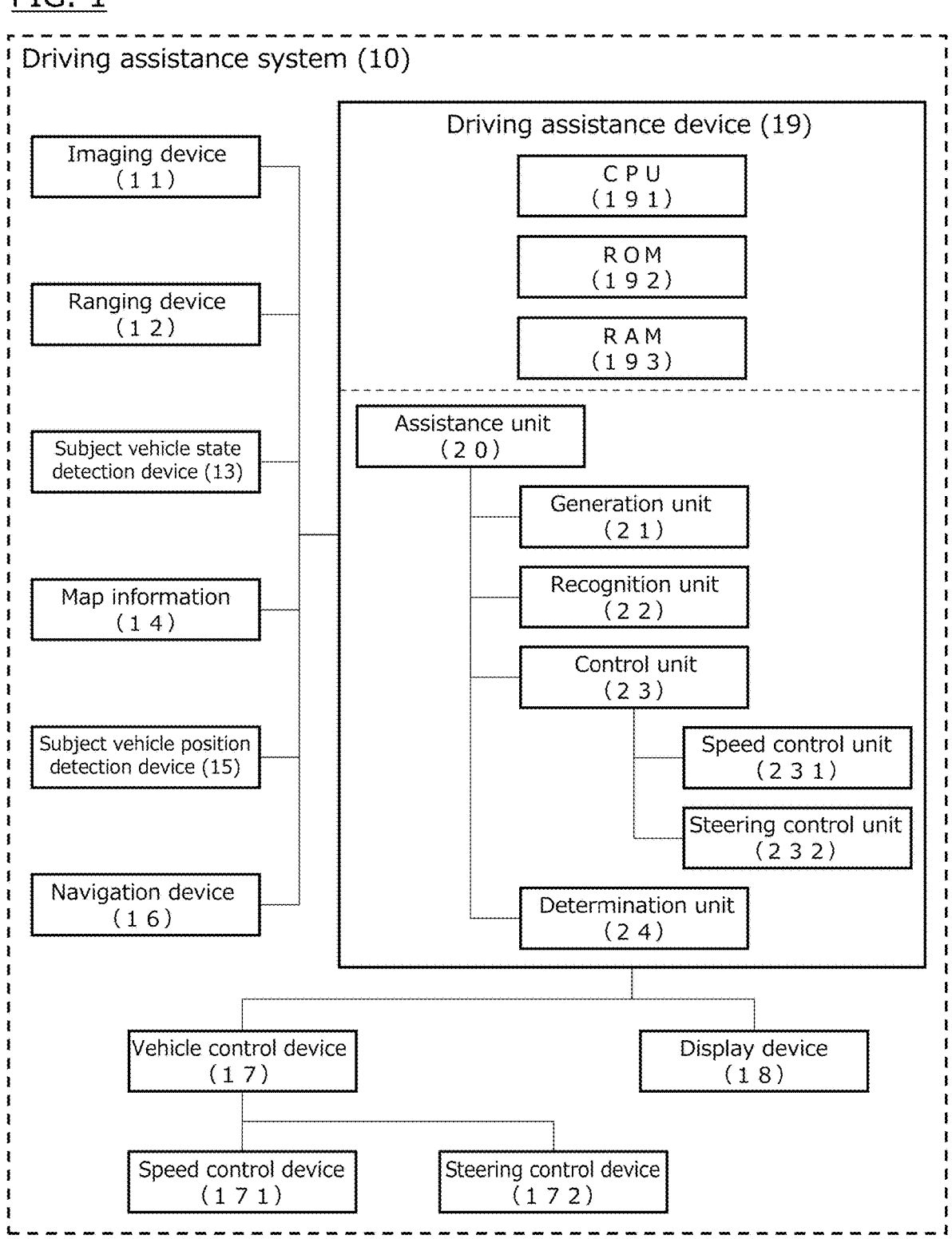
FIG. 1 is a block diagram illustrating a driving assistance system including a driving assistance device of the present invention.

FIG. 1 is a block diagram illustrating a driving assistance system 10 according to the present invention. The driving assistance system 10 is an onboard system and allows a vehicle to travel under autonomous travel control to a destination that is set by an occupant of the vehicle (occupants of the vehicle include the driver). The autonomous travel control refers to autonomously controlling the traveling operations of the vehicle using a driving assistance device, which will be described later. The traveling operations include all traveling operations such as acceleration, deceleration, starting, stopping, turning to the right or left, changing lanes, and pulling over.

Autonomously controlling the traveling operations means that the driving assistance device controls the traveling operations using devices of the vehicle. The driving assistance device controls these traveling operations to a certain extent that is preliminarily determined. Traveling operations that are not controlled by the driving assistance device are manually operated by the driver. In the present embodiment, the control of changing lanes from the subject vehicle lane, in which the vehicle travels, to a lane other than the subject vehicle lane (e.g., an adjacent lane) during the autonomous travel under the autonomous travel control will be specifically referred to as "autonomous lane change control," and a lane other than the subject vehicle lane will be also referred to as another lane.

Vehicles as described above include private vehicles as well as vehicles that are allocated in a vehicle allocation service. The vehicle allocation service refers to allocating and dispatching a vehicle to a user to transport the user from a boarding location to an alighting location. Examples of vehicle allocation services include allocation of manned and unmanned taxis, allocation of vehicles used for transportation services at airports, stations, hotels, etc., and allocation of vehicles used for car rental and ride-sharing services. In the following description, the subject vehicle will be simply referred to as the vehicle.

As illustrated in FIG. 1, the driving assistance system 10 includes an imaging device 11, a ranging device 12, a subject vehicle state detection device 13, map information 14, a subject vehicle position detection device 15, a navigation device 16, a vehicle control device 17, a display device 18, and a driving assistance device 19. The devices constituting the driving assistance system 10 are connected via a controller area network (CAN) or other onboard LAN and can exchange information with each other.

The imaging device 11 is a device that recognizes objects around the vehicle using images. The imaging device 11 may be, for example, one or more cameras such as cameras including CCDs or other imaging elements, ultrasonic cameras, or infrared cameras. Two or more imaging devices 11 can be provided in one vehicle. For example, such imaging devices 11 may be arranged in the front grille portion of the vehicle, below the right and left door mirrors, and near the rear bumper. This can reduce blind spots when recognizing objects around the vehicle.

The ranging device 12 is a device for calculating the relative distance and relative speed between the vehicle and an object. The ranging device 12 may be, for example, one or more radar devices or sonars, such as laser radars, millimeter wave radars, other similar radars (LRF and the like), light detection and ranging (LiDAR) units, and ultrasonic radars. Two or more ranging devices 12 can be provided in one vehicle. For example, such ranging devices 12 may be arranged at the front, right side, left side, and rear of the vehicle. This allows the relative distance and relative speed between the vehicle and a surrounding object to be calculated accurately.

Objects detected with the imaging device 11 and ranging device 12 are lane boundary lines of roads, center lines, road surface signs, median strips, guardrails, curbstones, highway side walls, road signs, traffic lights, crosswalks, construction sites, accident sites, traffic restrictions, etc. Objects also include obstacles that may affect the travel of the vehicle, such as automobiles (other vehicles) other than the subject vehicle, motorcycles (motorbikes), bicycles, and pedestrians. The detection results of the imaging device 11 and ranging device 12 are acquired by the driving assistance device 19 at predetermined time intervals as necessary.

The detection results of the imaging device 11 and ranging device 12 can be integrated or synthesized (so-called sensor fusion) by the driving assistance device 19. This can complement missing information about the detected objects. For example, the driving assistance device 19 can calculate the positional information of an object using the self-position information, which represents the position of the vehicle traveling, and the relative position (distance and direction) between the vehicle and the object. The self-position information is acquired by the subject vehicle position detection device 15. The calculated positional information of the object is integrated with multiple information items such as the detection results of the imaging device 11 and ranging device 12 and the map information 14 in the driving assistance device 19 and used as travel environmental information around the vehicle. Additionally or alternatively, the detection results of the imaging device 11 and ranging device 12 and the map information 14 can be used to recognize objects around the vehicle and predict their movements.

The subject vehicle state detection device 13 is a device for detecting the traveling state of the vehicle. Examples of the subject vehicle state detection device 13 include a vehicle speed sensor, an acceleration sensor, a yaw rate sensor (e.g., a gyro sensor), a steering angle sensor, and an inertial measurement unit. These devices are not particularly limited, and known devices can be used. The arrangement and number of these devices can be set as appropriate within a range in which the traveling state of the vehicle can be appropriately detected. The detection results of each device are acquired by the driving assistance device 19 at predetermined time intervals as necessary.

The map information 14 is information used for generation of a travel route, control of traveling operations, etc. and includes road information, facility information, and their attribute information. The road information and road attribute information include information on a road width, a radius of curvature of a road, a road shoulder structure, a road traffic regulation (speed limit, whether lane change is permitted), a merging point and a branching point of a road, a position at which the number of lanes increases/decreases, and other similar information. The map information 14 is high-definition map information that allows the movement trajectory for each lane to be perceived, and includes two-dimensional positional information and/or three-dimensional positional information at each map coordinate, road/lane boundary information at each map coordinate, road attribute information, lane inbound/outbound information, lane identification information, connection destination lane information, etc. A high-precision map is also referred to as a high-definition (HD) map.

The road/lane boundary information of the high-definition map information is information that represents a boundary between the travel route on which the vehicle travels and another area. The travel route on which the vehicle travels refers to a road for the vehicle to travel, and the form of the travel route is not particularly limited. The boundary exists on each of the right and left sides with respect to the traveling direction of the vehicle, and the form of the boundary is not particularly limited. The boundary is, for example, a road mark or a road structure. Examples of road marks include lane boundary lines and center lines. Examples of road structures include median strips, guardrails, curbstones, tunnels, and highway side walls. At a point at which the travel route boundary cannot be clearly specified, such as inside an intersection, a boundary is preliminarily set on the travel route. This boundary is an imaginary boundary, rather than a road mark or a road structure that actually exists.

The map information 14 is stored in a readable state in a recording medium provided in the driving assistance device 19, an onboard device, or a server on a network. The driving assistance device 19 acquires the map information 14 as necessary.

The subject vehicle position detection device 15 is a positioning system for detecting the current position of the vehicle and is not particularly limited, and a known device can be used. The subject vehicle position detection device 15 calculates the current position of the vehicle, for example, from radio waves or the like received from satellites for a global positioning system (GPS). Additionally or alternatively, the subject vehicle position detection device 15 may estimate the current position of the vehicle from the vehicle speed information and acceleration information acquired from the vehicle speed sensor, the acceleration sensor, and the gyro sensor, which are each the subject vehicle state detection device 13, and cross-check the estimated current position with the map information 14 thereby to calculate the current position of the vehicle.

The navigation device 16 is a device that refers to the map information 14 to calculate a travel route from the current position of the vehicle detected by the subject vehicle position detection device 15 to a destination that is set by an occupant (occupants include the driver). The navigation device 16 uses the road information, facility information, etc. of the map information 14 to search for a travel route for the vehicle to reach the destination from the current position. The travel route includes at least information on the road on which the vehicle travels, the travel lane, and the traveling direction of the vehicle, and is displayed, for example, in a linear format. There may be two or more travel routes depending on the search conditions. The travel route calculated by the navigation device 16 is output to the driving assistance device 19.

The vehicle control device 17 is an onboard computer such as an electronic control unit (ECU) and electronically controls onboard equipment that is responsible for the travel of the vehicle. The vehicle control device 17 includes a speed control device 171 that controls the traveling speed of the vehicle, and a steering control device 172 that controls the steering operation of the vehicle. The speed control device 171 and the steering control device 172 autonomously control the operations of drive device and steering device in accordance with control signals that are input from the driving assistance device 19. This allows the vehicle to autonomously travel along the set travel route. Information necessary for autonomous control by the speed control device 171 and the steering control device 172, such as the traveling speed, acceleration, steering angle, and attitude of the vehicle, is acquired from the subject vehicle state detection device 13.

Examples of the drive device controlled by the speed control device 171 include an electric motor and/or an internal-combustion engine as the traveling drive sources, a power transmission device including a drive shaft and an automatic transmission that transmit the output of the traveling drive sources to the drive wheels, a drive device that controls the power transmission device, etc. The braking device controlled by the speed control device 171 is, for example, a braking device that brakes the wheels. Control signals corresponding to the set traveling speed are input to the speed control device 171 from the driving assistance device 19. The speed control device 171 generates signals for controlling these components of the drive device based on the control signals that are input from the driving assistance device 19, and transmits the signals to the drive device thereby to autonomously control the traveling speed of the vehicle.

On the other hand, the steering device controlled by the steering control device 172 is a steering device that controls the steered wheels in accordance with the rotation angle of the steering wheel, and examples of the steering device include a steering actuator such as a motor attached to a column shaft of the steering wheel. The steering control device 172 autonomously controls the operation of the steering device based on the control signals input from the driving assistance device 19 so that the vehicle travels while maintaining a predetermined lateral position (position in the right-left direction of the vehicle) with respect to the set travel route. This control uses at least one of the detection results of the imaging device 11 and ranging device 12, the traveling state of the vehicle acquired with the subject vehicle state detection device 13, the map information 14, and the information on the current position of the vehicle acquired with the subject vehicle position detection device 15.

The display device 18 is a device for providing necessary information to the occupants of the vehicle. For example, the display device 18 is a liquid crystal display provided on an instrument panel or a projector such as a head-up display (HUD). The display device 18 may include an input device for an occupant of the vehicle to input instructions to the driving assistance device 19. Examples of the input device include a touch panel for inputting with a user's finger or a stylus pen, a microphone for acquiring voice instructions from the user, and a switch attached to the steering wheel of the vehicle. The display device 18 may include a speaker as an output device.

The driving assistance device 19 is a device for controlling the travel of the vehicle by controlling the devices constituting the driving assistance system 10 to cooperate with each other so that the vehicle travels to the set destination. The destination is set, for example, by an occupant of the vehicle. The driving assistance device 19 is, for example, a computer and includes a central processing unit (CPU) 191 that is a processor, a read only memory (ROM) 192 that stores programs, and a random access memory (RAM) 193 that serves as an accessible storage device. The CPU 191 is an operating circuit for achieving the functions of the driving assistance device 19 by executing the programs stored in the ROM 192.

The driving assistance device 19 has a driving assistance function of making the vehicle travel to a set destination under autonomous travel control. The driving assistance device 19 also has, as driving assistance functions, a route generation function of generating a travel route, an environment recognition function of recognizing the travel environment around the vehicle, and a travel control function of generating a travel trajectory and making the vehicle travel along the travel trajectory. The travel control function includes a vehicle speed control function of autonomously controlling the traveling speed of the vehicle and a steering control function of autonomously controlling the steering of the vehicle. In addition, the driving assistance device 19 has a determination function of determining whether or not the driver's steering operation satisfies a predetermined suspension condition.

The programs stored in the ROM 192 include those for achieving the above-described functions, and the CPU 191 executes the programs stored in the ROM 192 thereby to achieve these functions. In FIG. 1, functional blocks for achieving respective functions are extracted and illustrated for descriptive purposes.

<Functions of Functional Blocks>

The functions possessed by the functional blocks illustrated in FIG. 1, that is, an assistance unit 20, a generation unit 21, a recognition unit 22, a control unit 23, and a determination unit 24, will be described below.

Figure 2:
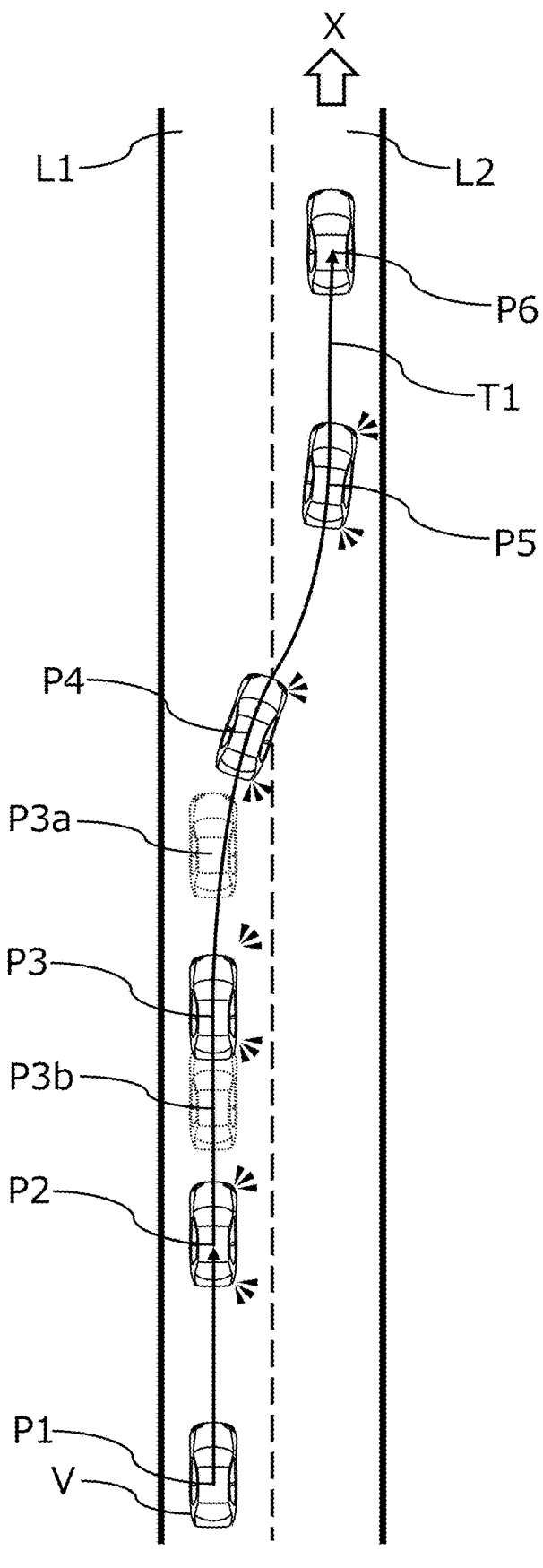
FIG. 2 is a plan view illustrating an example of a travel scene in which the driving assistance is executed by the driving assistance system illustrated in FIG. 1.

The assistance unit 20 has a driving assistance function of making the vehicle travel to a set destination under the autonomous travel control. FIG. 2 is a plan view illustrating an example of a travel scene in which the driving assistance device 19 uses the driving assistance function of the assistance unit 20 to autonomously control the travel of the vehicle. In the travel scene illustrated in FIG. 2, a road with two lanes on each side extends vertically in the drawing, and it is assumed that the vehicle travels on the road from the bottom to the top of the drawing. As illustrated in FIG. 2, the lane on the left side of the traveling direction is a lane L1 and the lane on the right side of the traveling direction is a lane L2.

In the travel scene illustrated in FIG. 2, it is assumed that the vehicle V travels at a position P1 of the lane L1 and heads for a destination X that is set by an occupant of the vehicle V and is located ahead in a lane L2. In this case, the driving assistance device 19 uses the driving assistance function of the assistance unit 20 to generate a travel route toward the destination X and make the vehicle V travel along the generated travel route under the autonomous travel control. This autonomous travel control is mainly controlled by the functions of the generation unit 21, recognition unit 22, control unit 23, and determination unit 24.

The generation unit 21 has a route generation function of generating a travel route for the vehicle to travel from the current position to the destination. The generation unit 21 also has a function of setting lanes for the vehicle to travel along the travel route. The driving assistance device 19 uses the navigation device 16 together with the route generation function of the generation unit 21 to generate a travel route for the vehicle to travel from the current position to the destination under the autonomous travel control. The driving assistance device 19 also sets lanes for traveling along the generated travel route. The driving assistance device 19 acquires information on the generated travel route and the set lanes from the navigation device 16 as necessary.

In the travel scene illustrated in FIG. 2, the driving assistance device 19 acquires the position P1, which is the current position of the vehicle V, from the subject vehicle position detection device 15, acquires road network data from the map information 14, and searches for a route to travel from the position P1 to the destination X using the navigation device 16. If there are two or more routes searched, the route with the shortest travel time or travel distance is selected.

The recognition unit 22 has an environment recognition function of recognizing the travel environment around the vehicle. The driving assistance device 19 uses the imaging device 11 and the ranging device 12 together with the environment recognition function of the recognition unit 22 to recognize the travel environment around the vehicle. The travel environment refers to information for determining whether the vehicle can maintain the current traveling state or needs to change the traveling state and includes, for example, information on the type and position of an object, the type and position of an obstacle if such an obstacle is present, road conditions such as road surface conditions, weather, etc. The driving assistance device 19 performs appropriate processing such as pattern matching and sensor fusion on the detection results of the imaging device 11 and ranging device 12 to recognize the travel environment.

Alternatively or in addition, the driving assistance device 19 may acquire image data from cameras installed on traffic lights, telephone poles, road signs, etc. and recognize obstacles present in a range that cannot be detected by the imaging device 11 of the vehicle. The driving assistance device 19 may also connect to a server that provides traffic information such as the occurrence of congestion, accidents, and road closures and recognize obstacles from the information acquired from the server. Furthermore, the driving assistance device 19 may use vehicle-to-vehicle communication with other vehicles traveling around the vehicle to recognize obstacles present in a range that cannot be detected by the imaging device 11 of the vehicle.

In the travel scene illustrated in FIG. 2, there are no obstacles around the vehicle V. The driving assistance device 19 therefore recognizes from the detection results of the imaging device 11 and ranging device 12 that no obstacles are detected around the vehicle V and that the travel environment does not include any objects that obstruct the travel of the vehicle V.

The control unit 23 has a travel control function of generating a travel trajectory for the vehicle V to travel along the generated travel route and controlling the traveling operations of the vehicle V so as to follow the generated travel trajectory. The driving assistance device 19 uses the travel control function of the control unit 23 to generate a travel trajectory for the vehicle V to travel along the travel route, and autonomously controls the traveling operations of the vehicle via the vehicle control device 17 (in particular, the speed control device 171 and the steering control device 172) so that the vehicle V follows the generated travel trajectory. The generation of the travel trajectory takes into account the entire length and entire width of the vehicle body of the vehicle V as well as the minimum turning radius of the vehicle V in addition to information on the shape, width, and curvature of a road contained in the map information 14, etc.

The control unit 23 has a vehicle speed control function of autonomously controlling the traveling speed of the vehicle V and a steering control function of autonomously controlling the steering of the vehicle V. The vehicle speed control function is mainly achieved by a speed control unit 231 while the steering control function is mainly achieved by a steering control unit 232. Hereinafter, the autonomous control of the traveling speed by the speed control unit 231 will be also simply referred to as autonomous speed control, and the autonomous control of the steering by the steering control unit 232 will be also simply referred to as autonomous steering control.

When detecting a preceding vehicle, the driving assistance device 19 uses the vehicle speed control function of the speed control unit 231 to allow the vehicle V to follow the preceding vehicle while performing inter-vehicle distance control so as to maintain the inter-vehicle distance in accordance with the vehicle speed with an upper limit of the vehicle speed that is set by the driver. On the other hand, when no preceding vehicle is detected, constant speed traveling is performed at a vehicle speed that is set by the driver. The former is also referred to as inter-vehicle distance control while the latter is also referred to as constant speed control. The driving assistance device 19 may use the vehicle speed control function to detect the speed limit of a traveling road from a road sign using the imaging device 11, or acquire the speed limit from the map information 14, to automatically set the speed limit as a vehicle speed.

To activate the vehicle speed control function with the speed control unit 231, the driver first operates a switch provided on the steering wheel to input a desired vehicle speed. For example, when the switch is pressed while the vehicle V is traveling at 70 km/h, the current vehicle speed is set without any modification, but if the desired vehicle speed is other than that, the switch is operated to increase or decrease the set speed. The inter-vehicle distance desired by the driver is selected, for example, from a plurality of stages of settings such as short distance/medium distance/long distance by operating a switch (e.g., an inter-vehicle distance adjustment switch).

The constant speed control is executed when the front radar or the like of the ranging device 12 detects no preceding vehicle ahead in the subject vehicle lane in which the vehicle V travels. In the constant speed control, the speed control device 171 controls the operation of the drive mechanisms such as the engine and the brake while feeding back the vehicle speed data obtained by the vehicle speed sensor, which is the subject vehicle state detection device 13, so as to maintain the set vehicle speed.

The inter-vehicle distance control is executed when the front radar or the like of the ranging device 12 detects a preceding vehicle ahead in the subject vehicle lane in which the vehicle V travels. In the inter-vehicle distance control, the speed control device 171 controls the operation of the drive mechanisms while feeding back the inter-vehicle distance data detected by the front radar so as to maintain the set inter-vehicle distance with an upper limit of the set vehicle speed.

If the preceding vehicle stops while the vehicle is traveling under the inter-vehicle distance control, the driving assistance device 19 makes the vehicle V also stop following the preceding vehicle. In addition, if the preceding vehicle starts, for example, within 30 seconds after the vehicle V stops, the driving assistance device 19 makes the vehicle V also start traveling to follow the preceding vehicle again under the inter-vehicle distance control. If the vehicle V stops for more than 30 seconds, the vehicle V does not start in an automated or autonomous manner even when the preceding vehicle starts, and after the preceding vehicle starts, the vehicle V starts traveling to follow the preceding vehicle again under the inter-vehicle distance control when a switch provided on the steering wheel is operated or the accelerator pedal is depressed.

When a predetermined condition is satisfied during the execution of the above-described autonomous speed control, the driving assistance device 19 uses the steering control function of the steering control unit 232 to control the operation of the steering actuator with the steering control device 172 and execute the autonomous steering control. The autonomous steering control includes lane keeping control and autonomous lane change control. The driving assistance device 19 controls the steering actuator with the steering control device 172 so that the vehicle V travels near the center of the lane under the lane keeping control, and assists the driver's steering operation. The driving assistance device 19 also performs lane changes through the autonomous traveling under the autonomous lane change control. In other words, the autonomous lane change control using the driving assistance device 19 is achieved mainly by the steering control function of the steering control unit 232.

As an example, it is assumed in the travel scene illustrated in FIG. 2 that after the vehicle V travels from the position P1 to a position P2, the driver operates the direction indicator lever at the position P2. In this case, the autonomous lane change control of the steering control unit 232 starts blinking the direction indicators, and when a preliminarily set lane change start condition is satisfied, the steering control unit 232 starts a lane change performance (abbreviated as LCP, hereinafter) that is a series of processes for the lane change under the autonomous travel control. When a button operation is performed to accept start of the autonomous lane change control, such as when the switch provided on the steering wheel is operated, the direction indicators may be blinked and the LCP may be started.

The driving assistance device 19 determines whether or not the lane change start condition is satisfied, based on the travel information acquired with the environment recognition function of the recognition unit 22. Examples of the lane change start condition include, but are not limited to, a condition in which all of the following conditions are satisfied:

The lane keeping mode is carried out in a hands-on mode;

Hands-on determination is being made;

The vehicle is traveling at a speed of 60 km/h or more;

There is a lane in the lane change direction;

The lane as the lane change destination includes a space to which a lane change is possible;

The type of lane markers indicates that a lane change is permitted;

The radius of curvature of the road is 250 m or more; and

The elapsed time after the driver operates the direction indicator lever is within one second.

The lane keeping mode in the hands-on mode, which will be described later in detail, refers to a state in which the driving assistance device 19 is executing the autonomous speed control with the speed control unit 231 and the lane keeping control with the steering control unit 232 and the holding of the steering wheel by the driver is detected. The hands-on determination being made refers to a state in which the driver continues to hold the steering wheel.

In the travel scene illustrated in FIG. 2, the lane L2 exists on the right side of the straight lane L1, and there is a space in the lane L2 for the vehicle V to enter. The lane change start condition is therefore satisfied when the driving assistance device 19 is in the lane keeping mode in the hands-on mode, the hands-on determination is being made, the vehicle V is traveling at 60 km/h or more, the lane change from the lane L1 to the lane L2 is possible, and the elapsed time after the driver operates the direction indicator lever is within one second.

When the lane change start condition is satisfied, the driving assistance device 19 starts the LCP under the autonomous lane change control. The LCP in this case includes lateral movement of the vehicle V to an adjacent lane (i.e., the lane L2) and lane change maneuver (abbreviated as LCM, hereinafter) for actually moving to the lane L2. Specifically, the driving assistance device 19 generates a travel trajectory T1 illustrated in FIG. 2, and changes lanes from the lane L1 to the lane L2 by following the travel trajectory T1 and traveling from the position P2 to a position P6. The driving assistance device 19 starts lateral movement to the lane L2 at a position P3 and starts the LCM at a position P4. At a position P5, the driving assistance device 19 turns off the direction indicators and completes the LCM. Then, at the position P6, the driving assistance device 19 completes the LCP and starts the lane keeping control. During the execution of the LCP, the driving assistance device 19 uses the display device 18 to present the driver with information indicating that the lane change is performed under the autonomous lane change control, and calls attention to the surroundings.

Figure 3A:
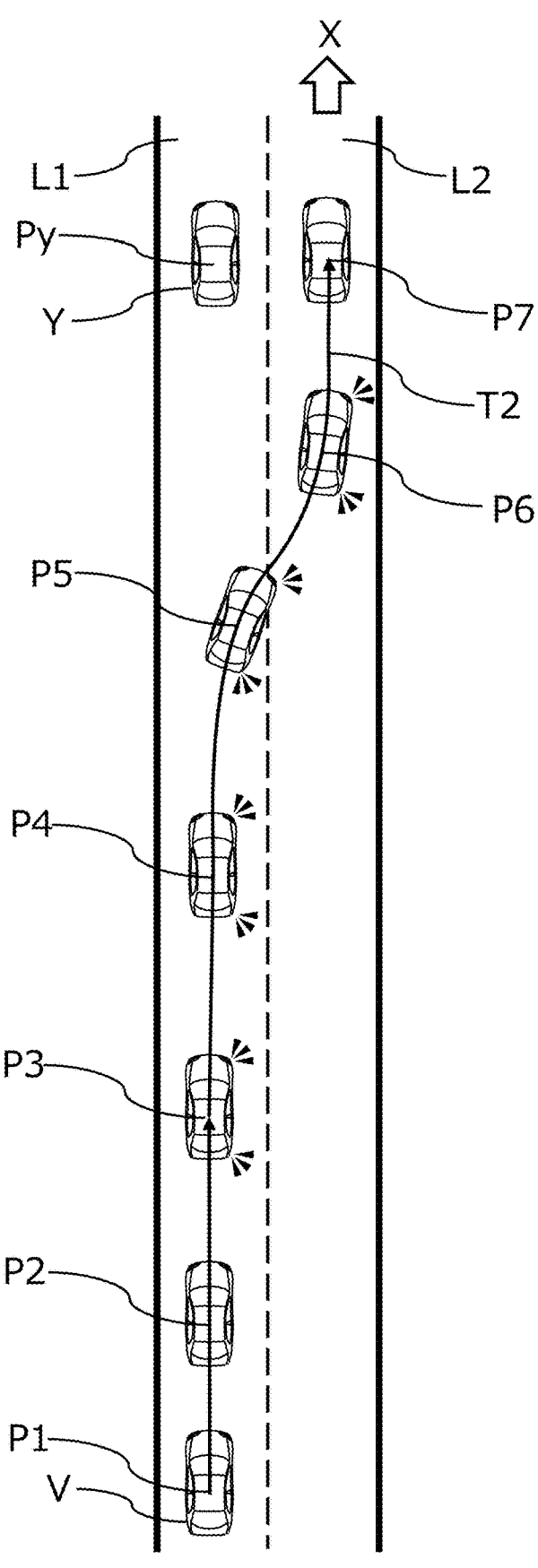
FIG. 3A is a plan view (part 1) illustrating another example of a travel scene in which the driving assistance is executed by the driving assistance system illustrated in FIG. 1.

In addition, the control unit 23 has a function of executing overtaking control that combines the lane keeping control and the autonomous lane change control. The overtaking control is the autonomous lane change control in a travel scene of overtaking a preceding vehicle. FIG. 3A is a plan view illustrating an example of a travel scene in which the driving assistance device 19 executes the overtaking control. The travel scene illustrated in FIG. 3A is the same as the travel scene illustrated in FIG. 2 except that there is another vehicle Y traveling at a position Py in the lane L1. As illustrated in FIG. 3A, when another vehicle Y slower than the vehicle V is present ahead in the lane L1 and a predetermined overtaking proposal condition that is preliminarily set is satisfied, the driving assistance device 19 uses the display device 18 to present the driver with overtaking information.

The overtaking information refers to information for proposing to overtake the other vehicle Y, which is a preceding vehicle, to the driver. The driving assistance device 19 starts the above-described LCP when the driver operates the switch provided on the steering wheel for acceptance (corresponding to the acceptance input) in response to the presentation of the overtaking information and an overtaking start condition that is preliminarily set is satisfied. The acceptance input includes the driver operating the direction indicator lever to the right or left.

The driving assistance device 19 determines whether or not the overtaking proposal condition and the overtaking start condition are satisfied, based on the information acquired using the environment recognition function of the recognition unit 22. The overtaking control may include a function of starting the LCP for overtaking a preceding vehicle when the driver operates the direction indicator lever even if no overtaking information is presented.

Examples of the overtaking proposal condition include, but are not limited to, a condition in which all of the following conditions are satisfied:

The lane keeping mode is carried out in a hands-off mode;

The vehicle is traveling at a speed of 60 km/h or more;

There is a lane in the lane change direction;

The lane as the lane change destination includes a space to which a lane change is possible after 5 seconds;

The type of lane markers indicates that a lane change is permitted;

The radius of curvature of the road is 250 m or more;

The speed of the subject vehicle is slower than the set speed by 5 km/h or more;

The speed of the preceding vehicle is slower than the set speed by 10 km/h or more;

The inter-vehicle distance between the subject vehicle and the preceding vehicle is less than a threshold that is preliminarily set based on the speed difference between the subject vehicle and the preceding vehicle; and The speed of the preceding vehicle present in the lane as the lane change destination satisfies a predetermined condition.

The lane keeping mode in the hands-off mode, which will be described later in detail, refers to a mode in which the autonomous speed control and the lane keeping control are being executed and the holding of the steering wheel by the driver is not necessary. The condition that the speed of the preceding vehicle present in the lane as the lane change destination satisfies a predetermined condition is applied differently depending on the type of the lane as the lane change destination. For example, when changing lanes from the left-side lane to the right-side lane on a multi-lane road with left-hand traffic, the condition is that the speed of the subject vehicle present in the left-side lane is higher than speed of the preceding vehicle present in the right-side lane by about 5 km/h or more. On the contrary, when changing lanes from the right-side lane to the left-side lane on a multi-lane road with left-hand traffic, the condition is that the speed difference between the subject vehicle and the preceding vehicle in the left-side lane is within about 5 km/h. The conditions regarding the relative speed difference between the subject vehicle and the preceding vehicle are reversed on a right-hand traffic road.

When the driver accepts the presentation of the overtaking information and a predetermined overtaking start condition that is preliminarily set is satisfied, the driving assistance device 19 blinks the direction indicators under the overtaking control and starts the LCP. Examples of the overtaking start condition include, but are not limited to, a condition in which all of the following conditions are satisfied:

The lane keeping mode is carried out in the hands-on mode;

Hands-on determination is being made;

The vehicle is traveling at a speed of 60 km/h or more;

There is a lane in the lane change direction;

The lane as the lane change destination includes a space to which a lane change is possible;

The type of lane markers indicates that a lane change is permitted;

The radius of curvature of the road is 250 m or more;

The speed of the subject vehicle is slower than the set speed by 5 km/h or more (when changing lanes to the right-side lane in a left-hand traffic);

The speed of the preceding vehicle is slower than the set speed by 10 km/h or more (when changing lanes to the right-side lane in a left-hand traffic);

The speed of the preceding vehicle present in the lane as the lane change destination satisfies a predetermined condition; and The elapsed time after the operation of a switch for accepting the start of the autonomous lane change control (lane change assist switch) is within 10 seconds.

The condition that the speed of the preceding vehicle is slower than the set speed by 10 km/h or more can be changed by the driver's setting, and the set speed after the change represents the overtaking start condition. As the speed that can be changed, for example, 15 km/h and 20 km/h can be selected in addition to 10 km/h. The condition that the speed of the preceding vehicle present in the lane as the lane change destination satisfies a predetermined condition is the same as that in the above-described overtaking proposal condition.

In the travel scene illustrated in FIG. 3A, the lane L2 exists on the right side of the straight lane L1, there is a space in the lane L2 for the vehicle V to enter, and the space still exists after 5 seconds. The overtaking proposal condition is therefore satisfied when the vehicle is in the lane keeping mode in the hands-off mode, the vehicle V is traveling at 60 km/h or more, a lane change is possible from the lane L1 to the lane L2, the vehicle speed of the vehicle V is slower than the set speed by 5 km/h or more, the vehicle speed of the other vehicle Y is slower than the set speed by 10 km/h or more, and the inter-vehicle distance between the vehicle V and the other vehicle Y is below a threshold that is preliminarily set based on the speed difference between the vehicle V and the other vehicle. When the overtaking proposal condition is satisfied, the driving assistance device 19 presents the overtaking information using the display device 18 when the vehicle V is traveling at the position P1.

When the driver who is presented with the overtaking information accepts the overtaking, the driving assistance device 19 determines whether or not the overtaking start condition is satisfied. In the travel scene of FIG. 3A, the overtaking proposal condition is satisfied, so the hands-on determination is being made, and the overtaking start condition is satisfied when the elapsed time is within 10 seconds from the operation of the lane change assist switch provided on the steering wheel. In the travel scene illustrated in FIG. 3A, it is assumed that the driver inputs acceptance of the execution of the overtaking control when the vehicle V is traveling at the position P2. When the overtaking start condition is satisfied, the LCP is started under the overtaking control, and lateral movement to the adjacent lane and the LCM are executed.

Specifically, the driving assistance device 19 generates a travel trajectory T2 illustrated in FIG. 3A and changes lanes from the lane L1 to the lane L2 by following the travel trajectory T2 and traveling from the position P3 to a position P7. The driving assistance device 19 starts blinking the direction indicators at the position P3, starts lateral movement to the lane L2 at the position P4, and starts the LCM at the position P5. The driving assistance device 19 turns off the direction indicators at the position P6 and completes the LCM. Then, at the position P7, the LCP is completed and the lane keeping control is started. The vehicle V travels along the lane L2 under the lane keeping control and overtakes the other vehicle Y.

Figure 3B:
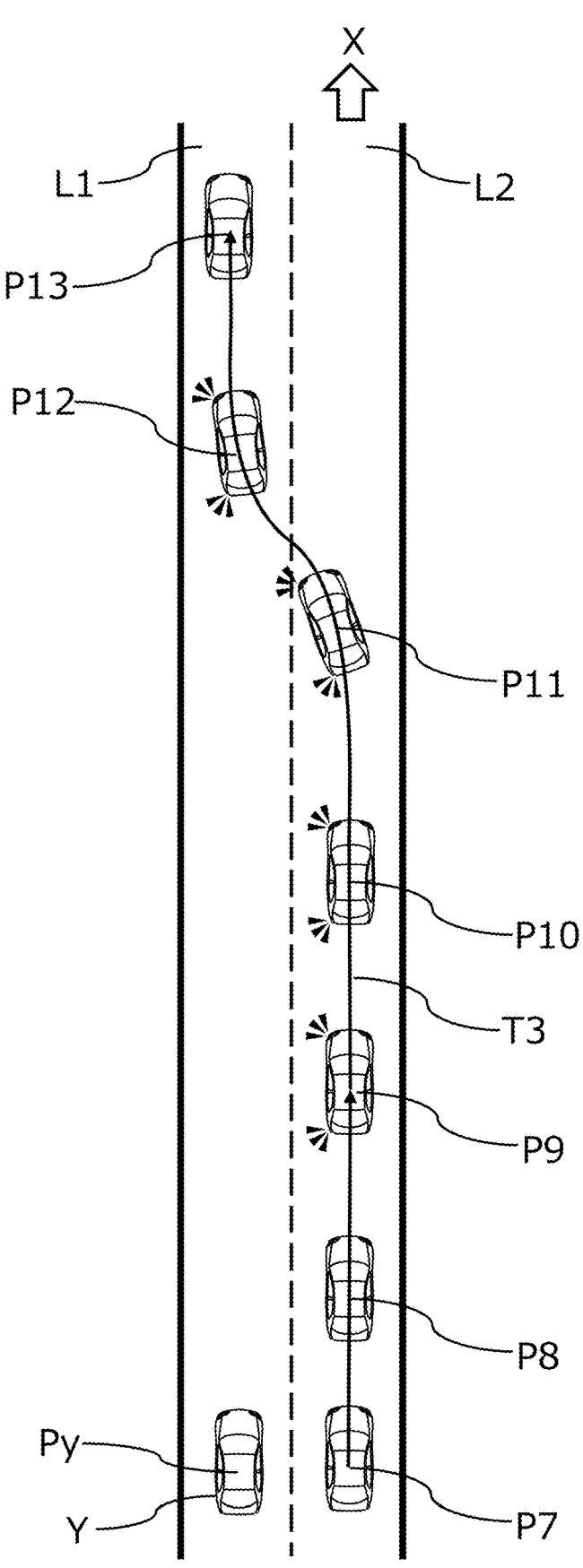
FIG. 3B is a plan view (part 2) illustrating another example of a travel scene in which the driving assistance is executed by the driving assistance system illustrated in FIG. 1.

After overtaking the other vehicle Y under the overtaking control, when the overtaking proposal condition is satisfied again, the driving assistance device 19 proposes to return to the original lane L1 to the driver via the display device 18. When the driver accepts this proposal by operating the switch provided on the steering wheel and the overtaking start condition is satisfied, as illustrated in FIG. 3B, the driving assistance device 19 starts the LCP to return the vehicle V to the original the lane L1 under the overtaking control.

Specifically, when the overtaking proposal condition is satisfied, the driving assistance device 19 uses the display device 18 to present the overtaking information when the vehicle V is traveling at the position P7. Then, provided that the driver inputs acceptance of the execution of the overtaking control when the vehicle V is traveling at a position P8, the driving assistance device 19 generates a travel trajectory T3 illustrated in FIG. 3B and changes lanes from the lane L2 to the original the lane L1 by following the travel trajectory T3 and traveling from a position P9 to a position P13. The driving assistance device 19 starts blinking the direction indicators at the position P9, starts lateral movement to the lane L1 at a position P10, and starts the LCM at a position P11. The driving assistance device 19 turns off the direction indicators at a position P12 and completes the LCM. Then, at the position P13, it completes the LCP and starts the lane keeping control.

In addition, the control unit 23 has a function of executing route traveling control that combines the lane keeping control and the autonomous lane change control. The driving assistance device 19 makes the vehicle V travel along the set travel route under the route traveling control. When there is a traveling direction change point such as a branching point, a merging point, an exit, or a toll gate on the set travel route, the distance to the traveling direction change point is within a predetermined distance, and a predetermined route traveling proposal condition is satisfied, the driving assistance device 19 presents the route traveling information under the route traveling control. The driving assistance device 19 proposes a lane change to the traveling direction change point via the display device 18 as the route traveling information.

The driving assistance device 19 starts the LCP when the proposal of the lane change is accepted through the operation of the switch provided on the steering wheel and a predetermined route traveling start condition is satisfied. The operation of that switch may be an operation of the direction indicator lever by the driver. The driving assistance device 19 determines, based on the information (travel environment) acquired with the environment recognition function of the acquisition unit 22, whether or not the route traveling proposal condition and the route traveling start condition are satisfied.

When the travel route is set by the navigation device 16, but the route traveling control is not executed or is disabled in the setting, the navigation device 16 executes a normal navigation that guides the travel route. The route traveling control may include a function of starting the LCP for traveling along the travel route when the driver operates the direction indicator lever even if no lane change is proposed with the route traveling information.

Figure 4:
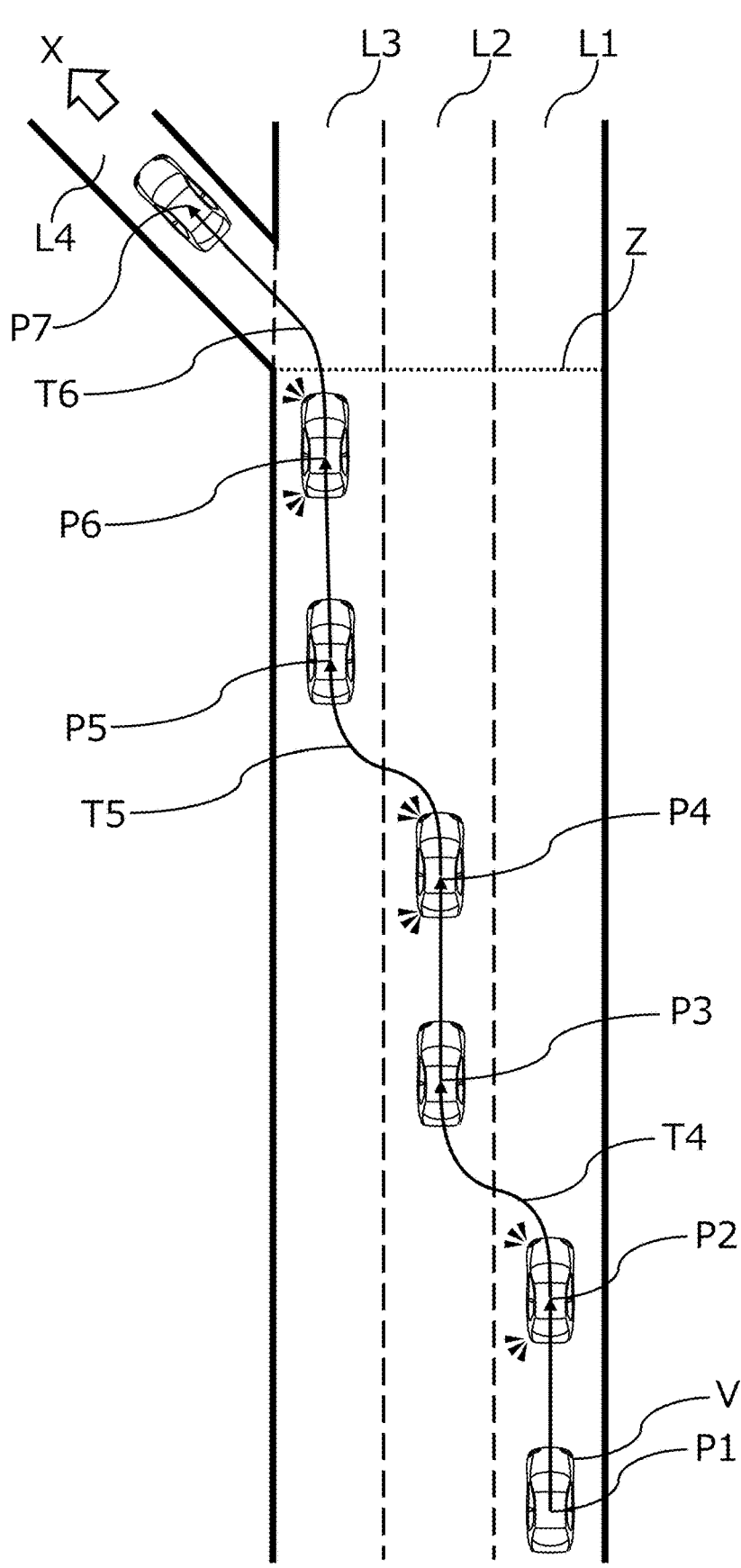
FIG. 4 is a plan view illustrating still another example of a travel scene in which the driving assistance is executed by the driving assistance system illustrated in FIG. 1.

FIG. 4 is a plan view illustrating an example of a travel scene in which the driving assistance device 19 performs the route traveling control. In the travel scene illustrated in FIG.

4, a road with three lanes on each side extends vertically in the drawing, and it is assumed that the vehicle travels on the road from the bottom to the top of the drawing. As illustrated in FIG. 4, the lane on the right side of the traveling direction is a lane L1, the center lane is a lane L2, the lane on the left side of the traveling direction is a lane L3, and the branch lane leading to a destination X is a lane L4.

In the travel scene illustrated in FIG. 4, it is assumed that the vehicle V travels at the position P1 of the lane L1 and heads for the destination X, which is set by an occupant of the vehicle V and is located ahead in the lane L4. In this case, when the location is within a first predetermined distance to a branching point Z (e.g., about 2.5 km to 1.0 km before the branching point Z) and the route traveling proposal condition is satisfied, the driving assistance device 19 propose a lane change from the lane L1 to the lane L2 under the route traveling assist control.

The first predetermined distance (also referred to as a lane change proposal section) is preliminarily set in accordance with the number of lane changes required to move to the lane in which the traveling direction change point is present. For example, as illustrated in FIG. 4, when it is necessary to change lanes twice from the lane L1 to the lane L3 via the lane L2, the section of 2.5 km to 1.0 km before the branching point Z represents the first predetermined distance (lane change proposal section).

Examples of the route traveling proposal condition include, but are not limited to, a condition in which all of the following conditions are satisfied:

A destination is set by the navigation device 16;

The lane keeping mode is carried out in the hands-off mode;

The vehicle is traveling at a speed of 60 km/h or more;

There is a lane in the lane change direction;

The type of lane markers indicates that a lane change is permitted; and

The radius of curvature of the road is 250 m or more.

In the route traveling proposal condition, even when the lane as the lane change destination does not include a space to which a lane change is possible, the route traveling information is presented in order to notify the driver that a lane change along the travel route is necessary.

In the travel scene illustrated in FIG. 4, the destination X is set, the lane L2 exists on the left side (lane change side) of the straight the lane L1, and there are no obstacles in the lane L2. The route traveling proposal condition is therefore satisfied when the vehicle is in the lane keeping mode in the hands-off mode, the vehicle V is traveling at 60 km/h or more, and the boundary between the lane L1 and the lane L2 is one through which a lane change is possible. In the travel scene illustrated in FIG. 4, provided that the route traveling proposal condition is satisfied, the route traveling information is presented to the driver using the display device 18 when traveling at the position P1.

When, at the position P1, the driver inputs the acceptance of the lane change for heading to the branching point and the route traveling start condition is satisfied, the driving assistance device 19 turns on the direction indicators to start the LCP under the route traveling control. Examples of the route traveling start condition include, but are not limited to, a condition in which all of the following conditions are satisfied:

The lane keeping mode is carried out in the hands-on mode;

Hands-on determination is being made;

The vehicle is traveling at a speed of 60 km/h or more;

There is a lane in the lane change direction;

The lane as the lane change destination includes a space to which a lane change is possible;

The type of lane markers indicates that a lane change is permitted;

The vehicle is traveling in the lane change proposal section; and

The radius of curvature of the road is 250 m or more.

In the travel scene illustrated in FIG. 4, the route traveling proposal condition is satisfied, and the route traveling start condition is therefore satisfied when the vehicle is in the lane keeping mode in the hands-on mode, a hands-on determination is being made, and the road illustrated in FIG. 4 is a lane change proposal section. When the route traveling start condition is satisfied, the driving assistance device 19 starts the LCP under the route traveling control and executes the lateral movement to the lane L2 and the LCM. For example, the driving assistance device 19 generates a travel trajectory T4 illustrated in FIG. 4 and autonomously controls the traveling operations of the vehicle V so that it follows the travel trajectory T4. When the LCM is completed, the driving assistance device 19 turns off the direction indicators and starts the lane keeping control at the position P3 of the lane L2. During the execution of the LCP, the driving assistance device 19 uses the display device 18 to present the driver with information indicating that the lane change is performed under the route traveling control, and calls attention to the surroundings.

As illustrated in FIG. 4, during the execution of the lane keeping control in the lane L2, when the location is within a second predetermined distance to the branching point Z (e.g., about 2.3 km to 700 m before the branching point) and the route traveling start condition is satisfied, the driving assistance device 19 turns on the direction indicators to start the second LCP under the route traveling assist control and performs the lane change from the lane L2 to the lane L3. For example, the driving assistance device 19 generates a travel trajectory T5 illustrated in FIG. 4 and makes the vehicle V travel to follow the travel trajectory T5 from a position P4 to a position P5. When the LCM is completed, the driving assistance device 19 turns off the direction indicators and starts the lane keeping control at the position P5 of the lane L3.

During the execution of the lane keeping control in the lane L3, when the location is within a third predetermined distance to the branching point Z (e.g., about 800 m to 150 m before the branching point) and the route traveling start condition is satisfied, the driving assistance device 19 turns on the direction indicators under the route traveling control. The driving assistance device 19 generates a travel trajectory T6 for entering the lane L4 under the route traveling control. Then, at the position P6 before the branching point Z, the autonomous steering control is started for entering the lane L4, which is a branch line, and the vehicle travels from the position P6 to the position P7 following the travel trajectory T6 and enters the lane L4 from the lane L3. When entry into the lane L4 is completed, the driving assistance device 19 turns off the direction indicators and starts the lane keeping control at the position P7 of the lane L4.

Figure 5:
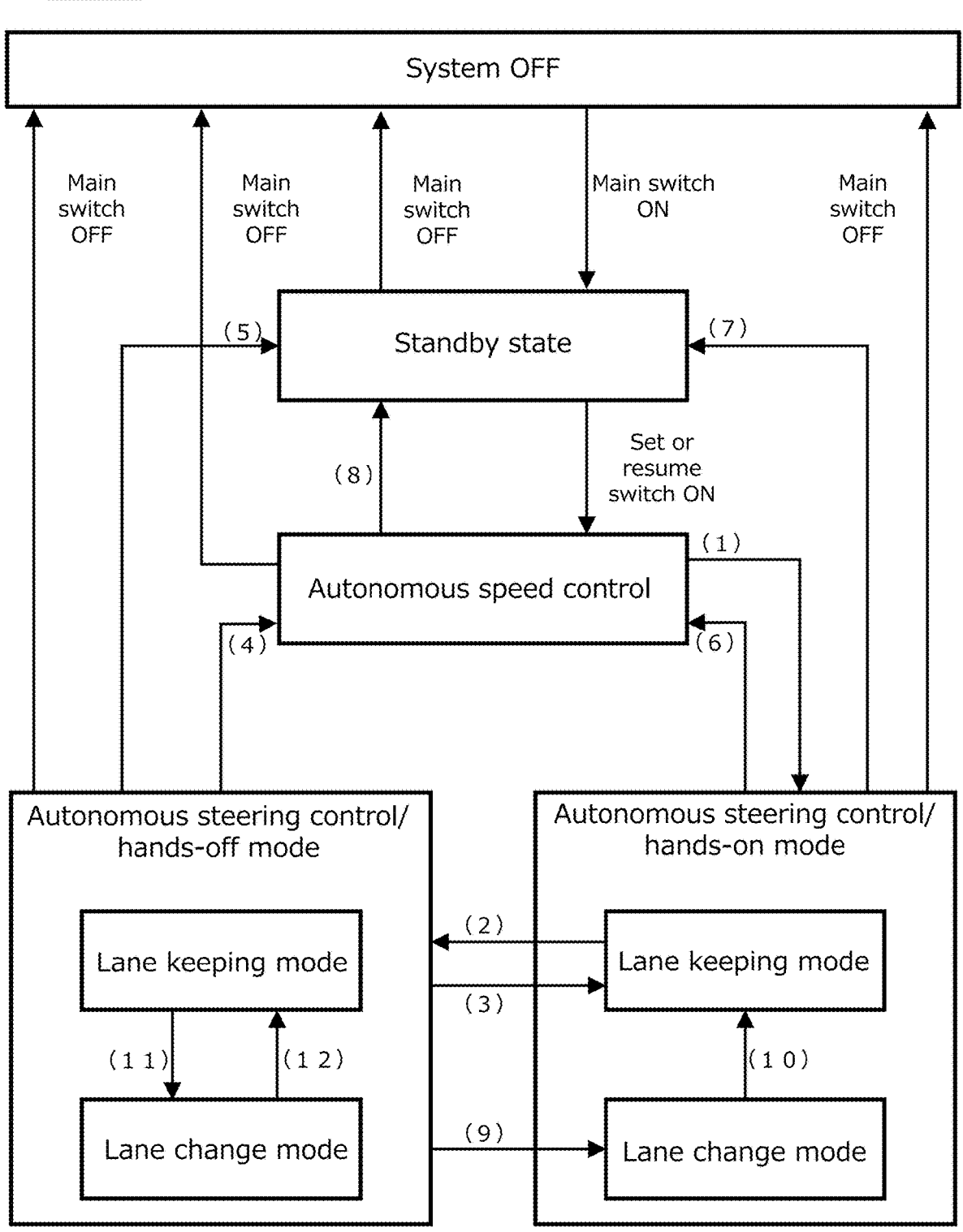
FIG. 5 is a block diagram illustrating a state transition of autonomous travel control in the driving assistance device of FIG. 1.

FIG. 5 is a block diagram illustrating a state transition of each function established in the driving assistance device 19. The system illustrated in FIG. 5 means an autonomous travel control system achieved by the driving assistance device 19. When a main switch is turned ON from the system OFF state illustrated in FIG. 5, the system comes to a standby state. The main switch is a switch that turns ON/OFF the power supply of the system which achieves the vehicle speed control function and steering control function of the driving assistance device 19, and is provided, for example, on the steering wheel.

From the standby state, the autonomous speed control with the vehicle speed control function is activated by turning ON a set/coast switch or a resume/acceleration switch. This allows the above-described constant speed control or inter-vehicle distance control to be started, and the driver can make the subject vehicle travel simply by operating the steering wheel without stepping on the accelerator or the brake. The resume/acceleration switch is a switch for resuming the autonomous speed control at the set speed before OFF or increasing the set speed after suspending (turning OFF) the autonomous speed control, or restarting the vehicle by the driving assistance device 19 after stopping following a preceding vehicle. The set/coast switch is a switch that starts the autonomous speed control at the speed during the travel or lowers the set speed. These switches are provided, for example, on the steering wheel.

During the execution of the autonomous speed control, when the condition (1) of FIG. 5 is satisfied, the mode transitions to the lane keeping mode of the autonomous steering control/hands-on mode. Examples of the condition (1) include a condition that the driver is holding the steering wheel in a state in which lane markers on both sides of the vehicle V are detected.

The hands-on mode refers to a mode in which the autonomous steering control with the autonomous steering control function does not operate unless the driver holds the steering wheel, while the hands-off mode refers to a mode in which the autonomous steering control with the autonomous steering control function operates even when the driver releases the steering wheel. The holding of the steering wheel by the driver is detected using a touch sensor of the subject vehicle state detection device 13.

During the execution of the lane keeping mode of the autonomous steering control/hands-on mode, when the condition (2) of FIG. 5 is satisfied, the mode transitions to the lane keeping mode of the autonomous steering control/hands-off mode. Examples of the condition (2) include a condition that the vehicle V is traveling on an automobile-only road with a high-precision map and the GPS signal is valid.

On the contrary, during the execution of the lane keeping mode of the autonomous steering control/hands-off mode, when the condition (3) of FIG. 5 is satisfied, the mode transitions to the lane keeping mode of the autonomous steering control/hands-on mode. Examples of the condition (3) include a condition that the traveling speed exceeds the speed limit.

During the execution of the lane keeping mode of the autonomous steering control/hands-off mode, when the condition (4) of FIG. 5 is satisfied, the autonomous steering control is suspended and transitions to the autonomous speed control. Examples of the condition (4) include a condition that the driver is operating the steering wheel.

During the execution of the lane keeping mode of the autonomous steering control/hands-off mode, when the condition (5) of FIG. 5 is satisfied, the autonomous steering control and the autonomous speed control are suspended and transition to the standby state. Examples of the condition (5) include a condition that the driver operates the brake.

During the execution of the autonomous steering control/hands-on mode, when the condition (6) of FIG. 5 is satisfied, the autonomous steering control is suspended and transitions to the autonomous speed control. Examples of the condition (6) include a condition that the driver operates the direction indicator lever.

During the execution of the autonomous steering control/hands-on mode, when the condition (7) of FIG. 5 is satisfied, the autonomous steering control and the autonomous speed control are suspended and transition to the standby state. Examples of the condition (7) include a condition that the driver operates the brake.

During the execution of the autonomous speed control, when the condition (8) of FIG. 5 is satisfied, the control transitions to the standby state. Examples of the condition (8) include a condition that the driver operates a cancel switch to turn OFF the autonomous speed control.

During the execution of the lane keeping mode of the autonomous steering control/hands-off mode, when the condition (9) of FIG. 5 is satisfied, the mode transitions to a lane change mode of the autonomous steering control/hands-on mode. Examples of the condition (9) include a condition that the driver operates a lane change assistance switch in response to a lane change proposal from the driving assistance system 10, a condition that the driver operates the direction indicator lever to execute the autonomous lane change control, and a condition that the driver holds the steering wheel to make the indication of intention to accept the lane change proposed by the system.

The lane change assistance switch is a switch for instructing (accepting) the start of a lane change when the driving assistance device 19 confirms with the driver that the lane change should be started. The lane change assistance switch is provided, for example, on the steering wheel.

During the execution of the lane change mode of the autonomous steering control/hands-on mode, when the condition (10) of FIG. 5 is satisfied, the mode transitions to the lane keeping mode of the autonomous steering control/hands-on mode. Examples of the condition (10) include a condition that the traveling speed exceeds the speed limit before the start of the LCP.

During the execution of the lane keeping mode of the autonomous steering control/hands-off mode after transition to this mode, when the condition (11) of FIG. 5 is satisfied, the mode transitions to the lane change mode of the autonomous steering control/hands-off mode. Examples of the condition (11) include a condition that the driver operates the lane change assistance switch, a condition that the driver operates the direction indicator lever to execute the autonomous lane change control, and a condition that the driver holds the steering wheel to make the indication of intention to accept the lane change proposed by the system.

During the execution of the lane change mode of the autonomous steering control/hands-off mode, when the condition (12) of FIG. 5 is satisfied, the mode transitions to the lane keeping mode of the autonomous steering control/hands-off mode. Examples of the condition (12) include a condition that the speed limit is exceeded before the start of the LCP.

When the main switch is turned OFF in any state of the autonomous steering control/hands-off mode, the autonomous steering control/hands-on mode, the autonomous speed control, and the standby mode, the system is turned OFF.

The determination unit 24 has a function of determining whether or not the steering operation input by the driver during execution of the autonomous lane change control satisfies a predetermined suspension condition and suspending the autonomous lane change control when determining that the steering operation satisfies the predetermined suspension condition. The period of time during execution of the autonomous lane change control refers, for example, to a period of time after the autonomous lane change control is started and before the vehicle V starts moving in the width direction of a road (lateral movement) or before the vehicle V starts the LCM. When the determination function of the determination unit 24 is used to determine that the driver's steering operation satisfies the predetermined suspension condition, the driving assistance device 19 suspends the autonomous lane change control.

The steering operation refers to an operation of turning the steered wheels of the vehicle V in the traveling direction of the vehicle V, for example, rotating the steering wheel. The steering operation is detected using a steering angle sensor, a torque sensor, etc. of the subject vehicle state detection device 13. The predetermined suspension condition is a condition under which the driving assistance device 19 suspends the autonomous lane change control, and examples of this include a condition that the absolute value of the rotation angle of the steering wheel of the vehicle V becomes greater than a predetermined angle and a condition that the absolute value of the steering torque input by the driver to the steering wheel becomes greater than a predetermined value. The steering torque is a torque that rotates the steering wheel. The predetermined suspension condition is not limited to these, and the above-described conditions can be combined as appropriate.

The rotation angle of the steering wheel is set to 0° when the steered wheels (e.g., front wheels) of the vehicle V are parallel to the front-rear direction of the vehicle V, and is defined as a positive angle when the steering wheel is rotated clockwise and a negative angle when the steering wheel is rotated counterclockwise. The steering torque input to the steering wheel is defined as a positive value when the steering wheel is rotated clockwise and a negative value when the steering wheel is rotated counterclockwise. The rotation angle of the steering wheel and the steering torque input to the steering wheel are detected, for example, by a steering angle sensor and a torque sensor of the subject vehicle state detection device 13.

The predetermined angle is a value corresponding to the vehicle speed of the vehicle V, and can be set to an appropriate value within a range in which the occupants of the vehicle V do not feel uncomfortable when the autonomous lane change control is suspended. Specifically, the predetermined angle is about 5° to 10° when the vehicle V is traveling at 80 to 100 km/h, and about 10° to 20° when the vehicle V is traveling at 60 to 80 km/h. The predetermined value of the steering torque is about 5 to 15 Nm when the vehicle V is traveling at 80 to 100 km/h, and about 20 to 30 Nm when the vehicle V is traveling at 60 to 80 km/h. In order to suppress changes in the behavior of the vehicle V, it is preferred to set the predetermined angle and the predetermined value to smaller values as the vehicle speed of the vehicle V increases. The predetermined angle and the steering torque are not limited to the above-described ranges, and can be used in appropriate combination in the present invention.

When determining that the driver's steering operation satisfies the predetermined suspension condition during the execution of the autonomous lane change control after the start of the autonomous lane change control, the driving assistance device 19 suspends the autonomous lane change control and transitions to travel by manual driving. In this case, the state of the driving assistance device 19 becomes the system OFF state illustrated in FIG. 5, and the travel of the vehicle is controlled by the driver's steering operation.

The manual driving refers to one in which the driving assistance device 19 does not perform the autonomous travel control of the traveling operation and the travel of the vehicle is controlled by the driver's operation. This transition to travel by manual driving is not an essential configuration of the present invention and may be added or omitted as necessary.

Alternatively, when determining that the driver's steering operation satisfies the predetermined suspension condition during the execution of the autonomous lane change control after the start of the autonomous lane change control, the driving assistance device 19 may maintain the speed control under the autonomous travel control and suspend the steering control under the autonomous travel control. In this case, the state of the driving assistance device 19 becomes the lane keeping mode of the autonomous steering control/hands-on mode illustrated in FIG. 5, and the driving assistance device 19 performs the lane keeping control. Maintaining the speed control under the autonomous travel control and suspending the steering control under the autonomous travel control when determining that the driver's steering operation satisfies the predetermined suspension condition is not an essential configuration of the present invention and may be added or omitted as necessary.

On the other hand, when determining that the steering operation detected during the execution of the autonomous lane change control after the start of the autonomous lane change control does not satisfy the predetermined suspension condition, the driving assistance device 19 corrects the traveling operation under the autonomous lane change control based on the steering operation. For example, the driving assistance device 19 advances or delays the timing of executing the traveling operation of the lane change based on the steering operation that does not satisfy the predetermined suspension condition. This correction of the traveling operation is not an essential configuration of the present invention and may be added or omitted as necessary. Alternatively or in addition, the driving assistance device 19 may shorten or lengthen the time required to execute the traveling operation of the lane change based on the steering operation. Shortening or lengthening the time required to execute the traveling operation of the lane change is not an essential configuration of the present invention and may be added or omitted as necessary. Alternatively or in addition, the driving assistance device 19 may increase or decrease the speed in the width direction of the subject vehicle lane (or road) when the vehicle V moves from the subject vehicle lane to another lane (e.g., an adjacent lane) based on the steering operation. Setting the speed in the width direction of the subject vehicle lane to be large or small when the vehicle V moves from the subject vehicle lane to another lane is not an essential configuration of the present invention and may be added or omitted as necessary.

As an example, in the autonomous lane change control illustrated in FIG. 2, it is assumed that the lateral movement to the lane L2 is started at the position P3, but before the lateral movement is started, a steering torque that turns the steering wheel to the left is detected between the positions P2 and P3. In this case, when the steering torque value is greater than a predetermined value, the autonomous lane change control is suspended as described above. On the other hand, when the steering torque value is not greater than the predetermined value, the driving assistance device 19 changes the position at which the vehicle V starts lateral movement to the lane L2 from the position P3 to a position P3a. In other words, the driving assistance device 19 delays the timing of the vehicle V starting the lateral movement in accordance with the steering torque input to the steering wheel.

As another example, in the autonomous lane change control illustrated in FIG. 2, it is assumed that before the lateral movement is started, a steering torque that turns the steering wheel to the right is detected between the positions P2 and P3. In this case, when the steering torque value is greater than a predetermined value, the autonomous lane change control is suspended as described above. On the other hand, when the steering torque value is not greater than the predetermined value, the driving assistance device 19 changes the position at which the vehicle V starts lateral movement to the lane L2 from the position P3 to a position P3b. In other words, the driving assistance device 19 advances the timing of the vehicle V starting the lateral movement.

When the timing of the vehicle V starting the lateral movement is changed, the position at which the LCP is completed may be the position that is initially set, or the position at which the LCP is completed may be changed to match the timing of change. For example, when the vehicle V starts the lateral movement from the position P3a, the position at which the LCP is completed may be the position P6, or may be a position ahead of the position P6 in the traveling direction. Likewise, when the vehicle V starts the lateral movement from the position P3b, the position at which the LCP is completed may be the position P6, or may be a position behind the position P6 in the traveling direction.

Alternatively, when a steering operation that does not satisfy the predetermined suspension condition is detected for a predetermined time or more after the start of the autonomous lane change control, the driving assistance device 19 may suspend the autonomous lane change control and transition to the autonomous travel control under which the vehicle is made to move straight ahead along the subject vehicle lane. That is, the state of the driving assistance device 19 becomes the lane keeping mode of the autonomous steering control/hands-on mode illustrated in FIG. 5, and the driving assistance device 19 performs the lane keeping control. The predetermined time can be set to an appropriate value within a range in which the occupants of the vehicle V do not feel uncomfortable when the autonomous lane change control is suspended, and is specifically about 5 to 60 seconds. When a steering operation that does not satisfy the predetermined suspension condition is detected for a predetermined time or more, suspending the autonomous lane change control and transitioning to the autonomous travel control under which the vehicle is made to move straight ahead along the subject vehicle lane is not an essential configuration of the present invention, and may be added or omitted as necessary.

In the autonomous lane change control illustrated in FIG. 2, the overtaking control illustrated in FIGS. 3A and 3B, and the route traveling control illustrated in FIG. 4, the driver makes an indication of intention to execute the autonomous lane change control before executing it. Specifically, in the autonomous lane change control illustrated in FIG. 2, an indication is made to accept the execution of the autonomous lane change control proposed by the driving assistance device 19, and in the overtaking control illustrated in FIGS. 3A and 3B and the route traveling control illustrated in FIG. 4, an indication is made to request the execution of the autonomous lane change control. These indications of intention are input to the driving assistance device 19 using at least one of the direction indicator switch and the steering wheel. To input an indication of intention, for example, the driver operates the direction indicator lever up or down and/or turns the steering wheel. The indications of the driver's intention are not limited to the above indications of acceptance and indications of request, and include other indications.

Other than the travel scenes illustrated in FIG. 2, FIGS. 3A and 3B, and FIG. 4, examples of travel scenes in which the autonomous lane change control is executed due to the indication of the driver's intention include a travel scene in which two or more lane changes are made in succession, a travel scene in which the driver accepts the proposal of the driving assistance device 19 based on the guidance of the navigation device 16 and changes lanes to a lane on the exit side of an automobile-only road or a branch lane, a travel scene in which a large vehicle such as a truck or bus is traveling ahead of the vehicle V and the driver of the vehicle V requests the execution of the autonomous lane change control because the visibility ahead of the vehicle V is poor, and a travel scene in which the driving assistance device 19 proposes the execution of the autonomous lane change control to the driver and the driver accepts it. The above-described travel scenes in which two or more lane changes are made in succession also include a travel scene in which the driver changes lanes to another lane once and then returns to the original subject vehicle lane.

However, the driving assistance device 19 of the present embodiment does not necessarily require the indication of the driver's intention to execute the autonomous lane change control. That is, the driving assistance device 19 of the present embodiment can execute the autonomous lane change control regardless of the indication of the driver's intention. For example, the driving assistance device 19 executes the autonomous lane change control regardless of the indication of the driver's intention in some travel scenes such as a travel scene in which the vehicle changes lanes only once to a lane adjacent to the subject vehicle lane, a travel scene in which the vehicle changes lanes without the driver's acceptance when overtaking another vehicle traveling ahead of the subject vehicle, and a travel scene in which when another vehicle traveling ahead of the subject vehicle is traveling at a speed slower than the speed limit, the driving assistance device 19 determines to execute the autonomous lane change control and maintains the vehicle speed of the subject vehicle. Here, in a travel scene in which the vehicle changes lanes to overtake a preceding vehicle without the driver's acceptance, the driving assistance device 19 performs both the lane change from the subject vehicle lane to an adjacent lane and the lane change from the adjacent lane to the subject vehicle lane without the driver's acceptance.

When the driver does not make an indication of intention to refuse the execution of the autonomous lane change control within a predetermined time after proposing the execution of the autonomous lane change control to the driver, the driving assistance device 19 assumes that the driver accepts the execution of the autonomous lane change control, and executes the autonomous lane change control regardless of the indication of the driver's intention. As another example, when the traveling direction of the vehicle V changes, the driving assistance device 19 requests the driver's acceptance of the execution of the autonomous lane change control, and executes the autonomous lane change control when the driver's acceptance is obtained. On the other hand, when the traveling direction of the vehicle V does not change, the driving assistance device 19 executes the autonomous lane change control based on the determination of the driving assistance device 19. As still another example, when the vehicle V can continue traveling along the travel route, the driving assistance device 19 executes the autonomous lane change control based on the determination of the driving assistance device 19 regardless of the indication of the driver's intention. On the other hand, when the vehicle V cannot continue traveling along the travel route, the driving assistance device 19 requests the driver's acceptance of the execution of the autonomous lane change control, and executes the autonomous lane change control when the driver's acceptance is obtained.

Thus, the autonomous lane change control of the present embodiment includes autonomous lane change control that is executed regardless of the indication of the driver's intention, and autonomous lane change control that is executed due to the indication of the driver's intention. In the following description, the autonomous lane change control that is executed regardless of the indication of the driver's intention will be referred to as first autonomous lane change control, and the autonomous lane change control that is executed due to the indication of the driver's intention will be referred to as second autonomous lane change control. The driving assistance device 19 executes the first autonomous lane change control without confirming the indication of the driver's intention, and executes the second autonomous lane change control when the indication of the driver's intention can be confirmed.

To confirm the indication of the driver's intention, the driving assistance device 19 determines whether or not the indication of the driver's intention is input to at least one of the direction indicator switch and the steering wheel. When a determination is made that the input is input to at least one of the direction indicator switch and the steering wheel, it is deemed that the indication of the driver's intention is confirmed. On the other hand, when a determination is made that the input is not input to at least one of the direction indicator switch and the steering wheel, it is deemed that the indication of the driver's intention is not confirmed. Examples of the input include the driver gripping and/or rotating the steering wheel and the driver operating the direction indicator switch. For example, when the driver grips the steering wheel (i.e., when hands-off is changed to hands-on), it is deemed to be the indication of the driver's intention of acceptance. Also, when the driver rotates the steering wheel, it may be deemed to be the indication of the driver's intention of acceptance. It is not essential for the present invention that the indication of the driver's intention is input to at least one of the direction indicator switch and the steering wheel, and this may be added or omitted as necessary.

Even when the driver performs the same steering operation in the first autonomous lane change control and the second autonomous lane change control, the intention of the driver performing the steering operation may be different. As an example, a case in which the driver performs a steering operation to rotate the steering wheel will be described.

FIG. 4 is a plan view illustrating a travel scene in which the driving assistance is performed by the driving assistance device 19 of the present embodiment as described above, that is, a travel scene in which the vehicle V currently traveling in the lane L1 autonomously changes lanes to the lane L4 via the lanes L2 and L3. For example, it is assumed that when the route traveling control illustrated in the figure is started by the driver's switch input as a trigger, the above steering operation is performed during the lane change from the lane L2 to the lane L3. In this case, since the driver accepts the execution of the route traveling control, it is unlikely that the driver intends to suspend the lane change from the lane L2 to the lane L3, and it is considered that, for example, the driver intends to delay the start of the lateral movement to the lane L3. In other words, it is considered that the driver wishes to continue the autonomous lane change control and does not desire the suspension of the control. Thus, when the driver performs a steering operation in a state of preliminarily recognizing that the lane change will be made, the autonomous lane change control can be prevented from being suspended against the driver's intention by setting the predetermined suspension condition so that the autonomous lane change control is unlikely to be suspended.

In contrast, as described above, FIGS. 3A and 3B are plan views illustrating an example of a travel scene in which the driving assistance device 19 executes the overtaking control. When the conditions for starting the overtaking control illustrated in FIGS. 3A and 3B are satisfied and the driving assistance device 19 starts the autonomous lane change control regardless of the indication of the driver's intention, if the steering operation is performed in the middle of changing lanes from the lane L1 to the lane L2, it is considered that the driver wishes to continue travel along the lane L1 and does not wish to change lanes to the lane L2. Thus, when the driver performs a steering operation in a state of not preliminarily recognizing that a lane change will be made, the predetermined suspension condition can be set so that the autonomous lane change control is unlikely to be continued, thereby preventing the autonomous lane change control from being continued against the driver's intention.

In this context, to suppress the uncomfortable feeling given to the driver due to the suspension of the autonomous lane change control, the driving assistance device 19 uses the determination function of the determination unit 24 to set the predetermined suspension condition for suspension of the first autonomous lane change control to a condition under which the autonomous lane change control is more readily suspended than under the predetermined suspension condition for suspension of the second autonomous lane change control. For example, the driving assistance device 19 sets the predetermined angle, which is the rotation angle of the steering wheel at which the autonomous lane change control is suspended, for the first autonomous lane change control to a smaller angle than the predetermined angle for the second autonomous lane change control. For example, the predetermined angle for the first autonomous lane change control is set to approximately 5° to 10°, and the predetermined angle for the second autonomous lane change control is set to approximately 2.5° to 5°, which is half that of the first autonomous lane change control. Alternatively or in addition, the driving assistance device 19 may set the predetermined value of the steering torque for suspending the autonomous lane change control for the first autonomous lane change control to be smaller than the predetermined value for the second autonomous lane change control. For example, the predetermined value for the first autonomous lane change control may be set to about 5 to 15 Nm, and the predetermined value for the second autonomous lane change control may be set to about 2.5 to 7.5 Nm, which is half the predetermined value for the first autonomous lane change control. Changing the predetermined angle and/or the predetermined value of the steering torque to set the predetermined suspension condition for suspension of the first autonomous lane change control to a condition under which the autonomous lane change control is more readily suspended than under the predetermined suspension condition for suspension of the second autonomous lane change control is not an essential configuration of the present invention, and may be added or omitted as necessary.

Alternatively or in addition, by changing the setting of the operation of the steering wheel without changing the predetermined angle of the rotation angle of the steering wheel and the predetermined value of the steering torque, the predetermined suspension condition for suspension of the first autonomous lane change control may be set to a condition under which the autonomous lane change control is more readily suspended than under the predetermined suspension condition for suspension of the second autonomous lane change control. For example, when a steering device is provided in which the rotation amount of the steering wheel required to change the steering angle of the steered wheels of the vehicle is variable, the rotation amount of the steering wheel for the first autonomous lane change control is set to be smaller than the rotation amount for the second autonomous lane change control. This allows the first autonomous lane change control to be suspended with less rotation of the steering wheel than the second autonomous lane change control. Alternatively or in addition, the assist gain for the driver's steering input may be set higher so that the torque required to rotate the steering wheel in the first autonomous lane change control is smaller than the torque required to rotate the steering wheel in the second autonomous lane change control. This allows the steering torque required to reach the predetermined angle to be larger, and the autonomous lane change control can be suspended with a smaller steering torque input than in the second autonomous lane change control. Setting the predetermined suspension condition for suspension of the first autonomous lane change control to a condition under which the autonomous lane change control is more readily suspended than under the predetermined suspension condition for suspension of the second autonomous lane change control by changing the setting of the operation of the steering wheel without changing the predetermined angle of the rotation angle of the steering wheel and the predetermined value of the steering torque is not an essential configuration of the present invention and may be added or omitted as necessary.

<Processing in Driving Assistance System>

Figure 6A:
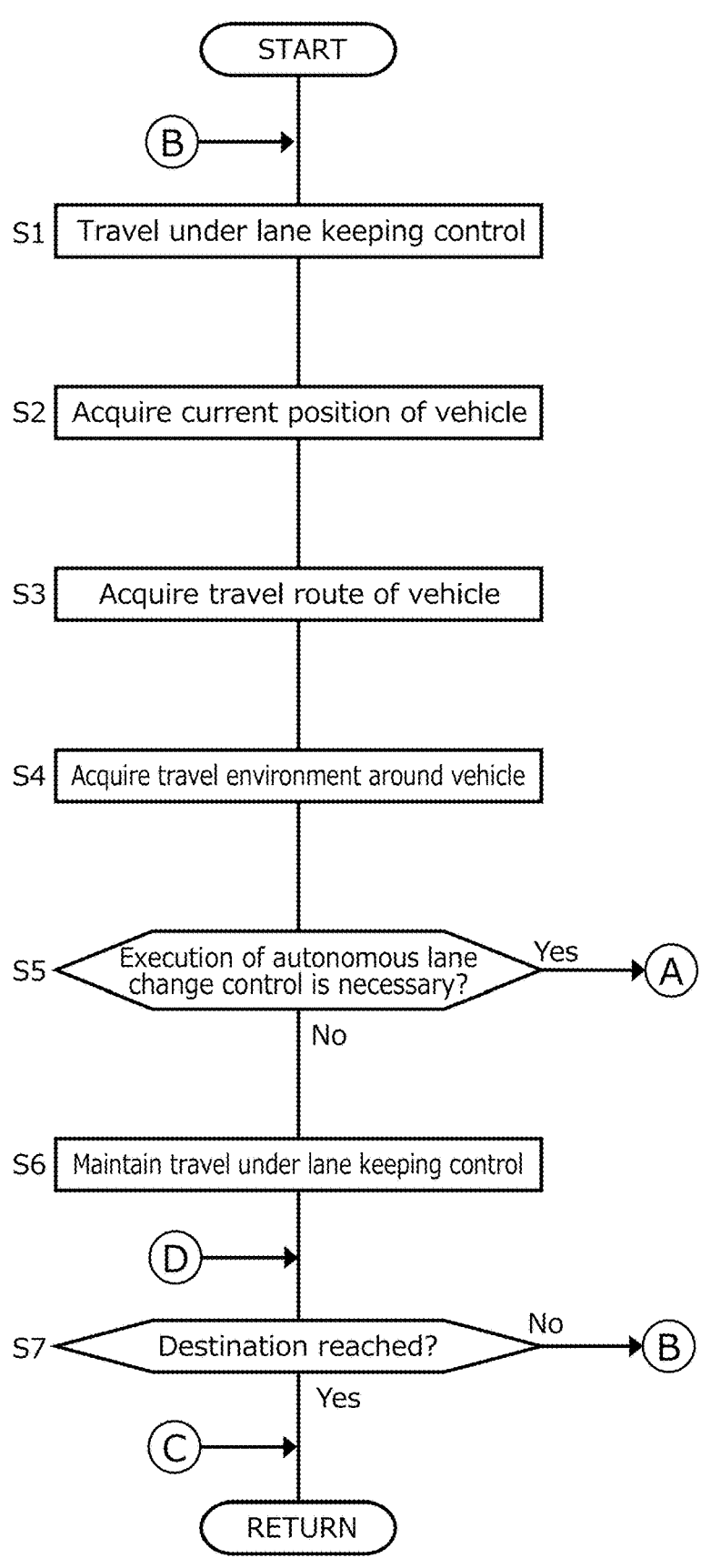
FIG. 6A is a flowchart (part 1) illustrating an example of a processing procedure in the driving assistance system of FIG. 1.
Figure 6B:
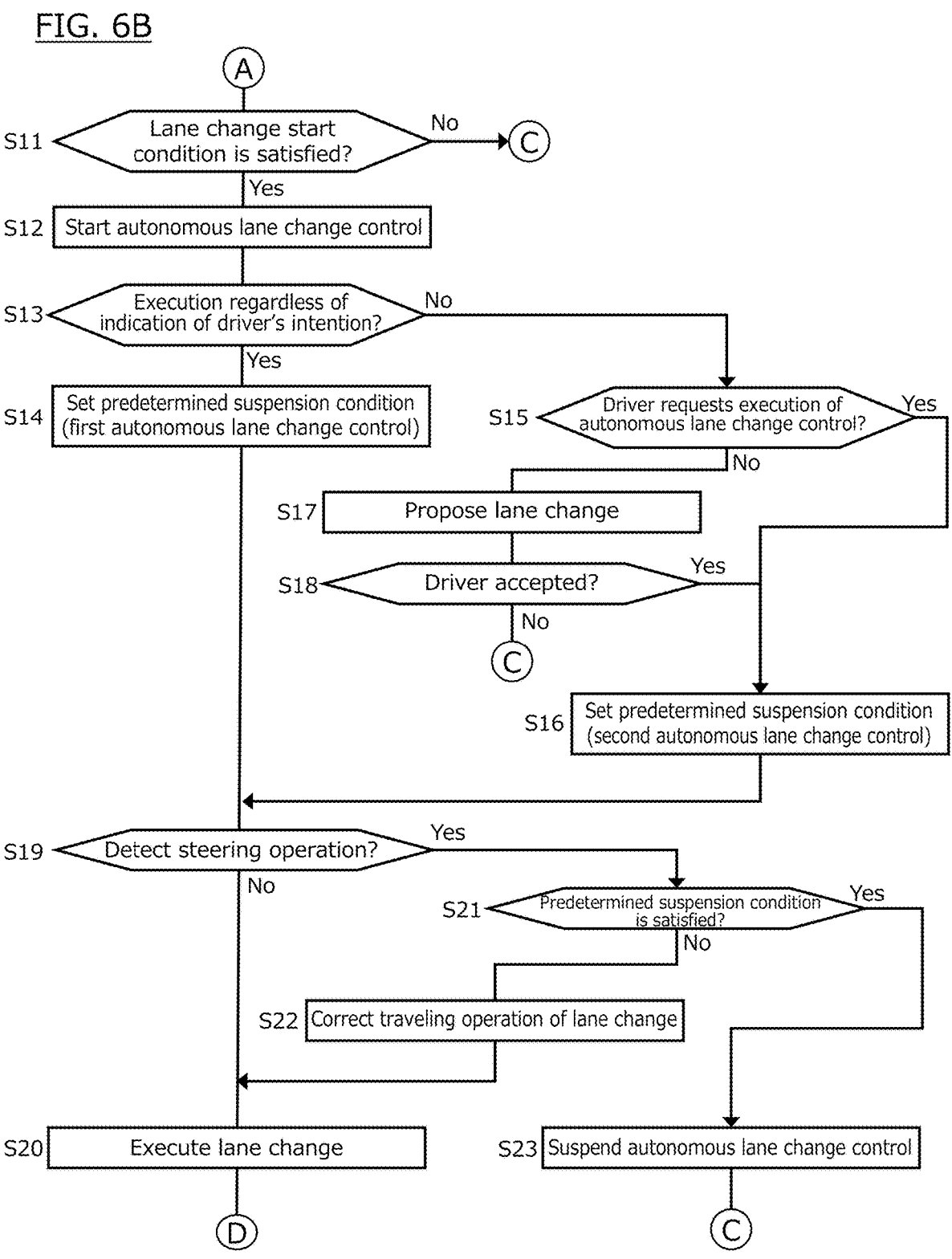
FIG. 6B is a flowchart (part 2) illustrating an example of a processing procedure in the driving assistance system of FIG. 1.

With reference to FIGS. 6A and 6B, the procedure when the driving assistance device 19 processes information will be described. FIGS. 6A and 6B are an example of flowcharts illustrating the processing of information executed in the driving assistance system 10 of the present embodiment. The processing described below is executed at a predetermined time interval by the CPU 191, which is processor of the driving assistance device 19. The flowcharts illustrated in FIGS. 6A and 6B are premised on a travel scene in which the vehicle V travels on a road under the lane keeping control.

First, in step S1 of FIG. 6A, the vehicle control device 17 is used to make the vehicle V travel under the lane keeping control with the steering control unit 232. Specifically, the speed control device 171 is used to control the vehicle speed of the vehicle V under the inter-vehicle distance control or constant speed control. In addition, the steering device of the vehicle V is controlled using the steering control device 172 under the autonomous steering control so that the vehicle travels along the subject vehicle lane. In the subsequent step S2, the environment recognition function of the recognition unit 22 is used to acquire the current position of the vehicle V from the subject vehicle position detection device 15. In the subsequent step S3, the travel control function of the control unit 23 is used to acquire a travel route from the navigation device 16. In the subsequent step S4, the environment recognition function of the recognition unit 22 is used to recognize the travel environment around the vehicle V from the detection results of the imaging device 11 and ranging device 12.

In step S5, the determination function of the determination unit 24 is used to determine whether or not the autonomous lane change control needs to be executed based on the information acquired in steps S2 to S4. For example, when it is necessary to change lanes from the subject vehicle lane to an adjacent lane that is a left-turn-only lane in order to make a left turn along the set travel route, a determination is made that the execution of the autonomous lane change control is necessary. In contrast, when it is possible to reach the destination by continuing travel along the subject vehicle lane, a determination is made that the execution of the autonomous lane change control is not necessary.

When a determination is made that the execution of the autonomous lane change control is not necessary, the process proceeds to step S6, in which travel under the lane keeping control is maintained. In the subsequent step S7, the driving assistance function of the assistance unit 20 is used to determine whether or not the vehicle V has arrived at the destination. When a determination is made that the vehicle V has arrived at the destination, the autonomous travel control is suspended, and the driver is prompted to drive by manual operation via the display device 18. In contrast, when a determination is made that the vehicle V has not arrived at the destination, the process proceeds to step S1, in which the above-described processing is repeated.

On the other hand, when a determination is made in step S5 that the execution of the autonomous lane change control is necessary, the process proceeds to step S11 of FIG. 6B. First, in step S11, the determination function of the determination unit 24 is used to determine whether or not the lane change start condition is satisfied. When a determination is made that the lane change start condition is not satisfied, the autonomous travel control is suspended, and the driver is prompted to manually change lanes via the display device 18. On the other hand, when a determination is made that the lane change start condition is satisfied, the process proceeds to step S12, in which autonomous lane change control is started.

In the subsequent step S13, the determination function of the determination unit 24 is used to determine whether or not the lane change under the autonomous lane change control is executed regardless of the indication of the driver's intention. When a determination is made that the lane change under the autonomous lane change control is executed regardless of the indication of the driver's intention, the process proceeds to step S14, in which the predetermined suspension condition for the first autonomous lane change control is set. That is, the predetermined suspension condition under which the autonomous lane change control is readily suspended is set. After that, the process proceeds to step S19.

In contrast, when a determination is made that the lane change under the autonomous lane change control is executed due to the indication of the driver's intention, the process proceeds to step S15. In step S15, the determination function of the determination unit 24 is used to determine whether or not the driver requests the execution of the autonomous lane change control. For example, when the driver operates a lane change assist switch to instruct the execution of the autonomous lane change control, the input of the instruction is acquired to determine that the driver requests the execution of the autonomous lane change control. In contrast, when no input related to the indication of the driver's intention is acquired, a determination is made that the driver does not request the execution of the autonomous lane change control.

When a determination is made that the driver requests the execution of the autonomous lane change control, the process proceeds to step S16, in which the predetermined suspension condition for the second autonomous lane change control is set. That is, the predetermined suspension condition under which the autonomous lane change control is not readily suspended is set. Then, the process proceeds to step S19. On the other hand, when a determination is made that the driver does not requests the execution of the autonomous lane change control, the process proceeds to step S17, in which the display device 18 is used to propose the execution of the lane change to the driver.

In the subsequent step S18, a determination is made whether or not the driver accepts the proposed lane change. When a determination is made that the driver accepts the proposed lane change, the process proceeds to step S16, while when a determination is made that the driver rejects the proposed lane change, the autonomous travel control is suspended, and the driver is prompted to drive manually via the display device 18. The indication of the driver's intention for acceptance is input via a switch provided on the steering wheel, a direction indicator switch, a direction indicator lever, the steering wheel, etc.

In step S19, the determination function of the determination unit 24 is used to determine whether or not a steering operation by the driver is detected. When a determination is made that a steering operation by the driver is not detected, the process proceeds to step S20, in which a lane change is executed under the autonomous lane change control of the control unit 23. Specifically, the LCP and LCM are executed. After executing the lane change, the process proceeds to step S7 of FIG. 6A.

In contrast, when a determination is made that a steering operation by the driver is detected, the process proceeds to step S21. In step S21, the determination function of the determination unit 24 is used to determine whether or not the input steering operation satisfies the predetermined suspension condition. For example, when the absolute value of the steering torque acquired from the torque sensor (subject vehicle state detection device 13) is greater than a predetermined value, a determination is made that the predetermined suspension condition is satisfied. In contrast, when the rotation angle of the steering wheel acquired from the steering angle sensor (subject vehicle state detection device 13) is not greater than the predetermined angle, a determination is made that the predetermined suspension condition is not satisfied.

When a determination is made that the steering operation does not satisfy the predetermined suspension condition, the process proceeds to step S22, in which the traveling operation of the lane change is corrected in accordance with the steering operation. For example, in the case of changing lanes to the right in the traveling direction, when torque is detected that turns the steering wheel to the left in the traveling direction, the timing of the vehicle starting the lateral movement is delayed. Then, the process proceeds to step S20, in which the lane change is executed based on the corrected traveling operation.

In contrast, when a determination is made that the steering operation satisfies the predetermined suspension condition, the process proceeds to step S23, in which the autonomous lane change control is suspended. Then, the autonomous travel control is suspended, and the driver is prompted to drive manually via the display device 18. When a determination is made in step S21 that the steering operation does not satisfy the predetermined suspension condition, instead of proceeding to step S22, the process may proceed to step S1 of FIG. 6A for transitioning to the travel under the lane keeping control. Also, when a determination is made in step S21 that the steering operation satisfies the predetermined suspension condition, the autonomous lane change control may be suspended, and the process may proceed to step S1 of FIG. 6A for transitioning to the travel under the lane keeping control.

ASPECTS OF THE PRESENT INVENTION

As described above, according to the present embodiment, a driving assistance method for a vehicle V executed by a processor is provided, comprising: executing autonomous lane change control under autonomous travel control to change lanes from a subject vehicle lane to a lane other than the subject vehicle lane, the vehicle V traveling in the subject vehicle lane; and suspending the autonomous lane change control when a driver's steering operation input during execution of the autonomous lane change control satisfies a predetermined suspension condition, the processor operating to: execute first autonomous lane change control without confirming an indication of the driver's intention, the first autonomous lane change control being executed regardless of the indication of the driver's intention; execute second autonomous lane change control when the indication of the driver's intention can be confirmed, the second autonomous lane change control being executed due to the indication of the driver's intention; and set the predetermined suspension condition for the first autonomous lane change control to a condition under which the autonomous lane change control is more readily suspended than under the predetermined suspension condition for the second autonomous lane change control. This allows the autonomous lane change control to be appropriately suspended depending on the travel scene.

Additionally or alternatively, according to the driving assistance method of the present embodiment, the indication of intention may include an indication of accepting execution of the autonomous lane change control proposed by a driving assistance device and an indication of the driver requesting the execution of the autonomous lane change control, and the indication of intention may be input to the processor using at least one of a direction indicator switch and a steering wheel. This allows the indication of the driver's intention to be appropriately input to the driving assistance device 19.

Additionally or alternatively, according to the driving assistance method of the present embodiment, the predetermined suspension condition may include at least one of a condition that an absolute value of a rotation angle of a steering wheel of the vehicle becomes greater than a predetermined angle and a condition that an absolute value of a steering torque input by the driver to the steering wheel becomes greater than a predetermined value. This allows the suspension of the autonomous lane change control to be determined more accurately.

Additionally or alternatively, according to the driving assistance method of the present embodiment, the processor may set, as the predetermined suspension condition, at least one of: a condition for setting the predetermined angle in the first autonomous lane change control smaller than the predetermined angle in the second autonomous lane change control; a condition for setting the predetermined value in the first autonomous lane change control smaller than the predetermined value in the second autonomous lane change control; a condition for setting, regarding a rotation amount of the steering wheel required to change a steering angle of steered wheels of the vehicle, the rotation amount in the first autonomous lane change control smaller than the rotation amount in the second autonomous lane change control; and a condition for setting a torque required to rotate the steering wheel in the first autonomous lane change control smaller than the torque required to rotate the steering wheel in the second autonomous lane change control. This allows a condition to be more reliably set under which the first autonomous lane change control is more readily suspended than under the second autonomous lane change control.

Additionally or alternatively, according to the driving assistance method of the present embodiment, when the steering operation satisfies the predetermined suspension condition after the autonomous lane change control is started, the processor may operate to transition to manual driving or maintain speed control under the autonomous travel control and suspend steering control under the autonomous travel control. This allows for a prompt transition to a predetermined state after the autonomous lane change control is suspended.

Additionally or alternatively, according to the driving assistance method of the present embodiment, when the steering operation that does not satisfy the predetermined suspension condition is detected after the autonomous lane change control is started, the processor may operate to correct the autonomous lane change control based on the steering operation that does not satisfy the predetermined suspension condition. This allows the indication of the driver's intention to be reflected on the autonomous lane change control.

Additionally or alternatively, according to the present embodiment, a driving assistance device 19 for a vehicle V is provided, comprising: a control unit 23 configured to execute autonomous lane change control under autonomous travel control to change lanes from a subject vehicle lane to a lane other than the subject vehicle lane, the vehicle V traveling in the subject vehicle lane; and a determination unit 24 configured to suspend the autonomous lane change control when a driver's steering operation input during execution of the autonomous lane change control satisfies a predetermined suspension condition, the control unit 23 operating to: execute first autonomous lane change control without confirming an indication of the driver's intention, the first autonomous lane change control being executed regardless of the indication of the driver's intention; and execute second autonomous lane change control when the indication of the driver's intention can be confirmed, the second autonomous lane change control being executed due to the indication of the driver's intention, the determination unit 24 operating to set the predetermined suspension condition for the first autonomous lane change control to a condition under which the autonomous lane change control is more readily suspended than under the predetermined suspension condition for the second autonomous lane change control. This allows the autonomous lane change control to be appropriately suspended depending on the travel scene.

In the driving assistance method and driving assistance device 19 for a vehicle of the present embodiment, the configurations described in the above-described aspects may be freely combined and used, and the combination is not particularly limited. Moreover, in the driving assistance method and driving assistance device 19 for a vehicle of the present embodiment, not only the configurations described in the above-described aspects but also the configurations described in the embodiments may be freely combined, and the combinations are not particularly limited.

DESCRIPTION OF REFERENCE NUMERALS

10 Driving assistance system
11 Imaging device
12 Ranging device
13 Subject vehicle state detection device
14 Map information
15 Subject vehicle position detection device
16 Navigation device
17 Vehicle control device
171 Speed control device
172 Steering control device
18 Display device
19 Driving assistance device
191 CPU (processor)
192 ROM
193 RAM
20 Assistance unit
21 Generation unit
22 Recognition unit
23 Control unit
231 Speed control unit
232 Steering control unit
24 Determination unit
L1, L2, L3, L4 Lane
P1, P2, P3, P3a, P3b, P4, P5, P6, P7, P8, P9, P10, P11, P12, P13, Py Position
T1, T2, T3, T4, T5, T6 Travel trajectory
V Vehicle (subject vehicle)
X Destination
Y Another vehicle
Z Branching point

The invention claimed is:

1. A driving assistance method for a vehicle executed by a processor, comprising:
executing autonomous lane change control under autonomous travel control to change lanes from a subject vehicle lane to a lane other than the subject vehicle lane, the vehicle traveling in the subject vehicle lane; and
suspending the autonomous lane change control when a steering operation of a driver input during execution of the autonomous lane change control satisfies a predetermined suspension condition, the method further comprising:
executing first autonomous lane change control without confirming an indication of a driver's intention, the first autonomous lane change control being executed regardless of the indication of the driver's intention;
executing second autonomous lane change control when the indication of the driver's intention can be confirmed, the second autonomous lane change control being executed due to the indication of the driver's intention; and
setting the predetermined suspension condition for the first autonomous lane change control to a condition under which the autonomous lane change control is more readily suspended than under the predetermined suspension condition for the second autonomous lane change control.

2. The driving assistance method for a vehicle according to claim 1, wherein the indication of intention includes an indication of accepting execution of the autonomous lane change control proposed by a driving assistance device and an indication of the driver requesting the execution of the autonomous lane change control, and
the indication of intention is input to the processor using at least one of a direction indicator switch and a steering wheel.

3. The driving assistance method for a vehicle according to claim 1, wherein the predetermined suspension condition includes at least one of a condition that an absolute value of a rotation angle of a steering wheel of the vehicle becomes greater than a predetermined angle and a condition that an absolute value of a steering torque input by the driver to the steering wheel becomes greater than a predetermined value.

4. The driving assistance method for a vehicle according to claim 3, wherein the predetermined suspension condition is set as, at least one of:
a condition for setting the predetermined angle in the first autonomous lane change control smaller than the predetermined angle in the second autonomous lane change control;
a condition for setting the predetermined value in the first autonomous lane change control smaller than the predetermined value in the second autonomous lane change control;
a condition for setting, regarding a rotation amount of the steering wheel required to change a steering angle of steered wheels of the vehicle, the rotation amount in the first autonomous lane change control smaller than the rotation amount in the second autonomous lane change control; and
a condition for setting a torque required to rotate the steering wheel in the first autonomous lane change control smaller than the torque required to rotate the steering wheel in the second autonomous lane change control.

5. The driving assistance method for a vehicle according to claim 1, wherein when the steering operation satisfies the predetermined suspension condition after the autonomous lane change control is started, the processor operates to transition to manual driving or maintain speed control under the autonomous travel control and suspend steering control under the autonomous travel control.

6. The driving assistance method for a vehicle according to claim 1, wherein when the steering operation that does not satisfy the predetermined suspension condition is detected after the autonomous lane change control is started, the processor operates to correct a traveling operation under the autonomous lane change control based on the steering operation that does not satisfy the predetermined suspension condition.

7. A driving assistance device for a vehicle, comprising:
a control unit configured to execute autonomous lane change control under autonomous travel control to change lanes from a subject vehicle lane to a lane other than the subject vehicle lane, the vehicle traveling in the subject vehicle lane; and
a determination unit configured to suspend the autonomous lane change control when a driver's steering operation input during execution of the autonomous lane change control satisfies a predetermined suspension condition, the control unit operating to:
execute first autonomous lane change control without confirming an indication of a driver's intention, the first autonomous lane change control being executed regardless of the indication of the driver's intention; and execute second autonomous lane change control when the indication of the driver's intention can be confirmed, the second autonomous lane change control being executed due to the indication of the driver's intention, the determination unit operating to:

set the predetermined suspension condition for the first autonomous lane change control to a condition under which the autonomous lane change control is more readily suspended than under the predetermined suspension condition for the second autonomous lane change control.

\* \* \* \* \*